United States Patent [19]

Koga

[11] 4,371,895
[45] Feb. 1, 1983

[54] CODED VIDEO SIGNAL TRANSMITTING AND RECEIVING SYSTEM

[75] Inventor: Toshio Koga, Tokyo, Japan

[73] Assignee: Nippon Electric Co., Ltd., Tokyo, Japan

[21] Appl. No.: 225,401

[22] Filed: Jan. 15, 1981

[30] Foreign Application Priority Data

| Jan. 18, 1980 [JP] | Japan | 55-4379 |
| Sep. 12, 1980 [JP] | Japan | 55-126125 |
| Sep. 12, 1980 [JP] | Japan | 55-126126 |
| Sep. 12, 1980 [JP] | Japan | 55-126127 |
| Dec. 1, 1980 [JP] | Japan | 55-169407 |

[51] Int. Cl.³ ............................................. H04N 7/12
[52] U.S. Cl. ..................................... 358/136; 358/138; 358/105; 364/515
[58] Field of Search ............... 358/260, 261, 133, 135, 358/138, 136, 105; 364/515

[56] References Cited

U.S. PATENT DOCUMENTS

| 4,133,006 | 1/1979 | Iinuma | 358/133 |
| 4,144,543 | 3/1979 | Koga | 358/136 |
| 4,215,375 | 7/1980 | Usubuchi | 358/261 |
| 4,259,693 | 3/1981 | Aaron | 358/261 |

OTHER PUBLICATIONS

IEEE Transactions on Communications, Sep., 1975, "Bandwidth Reduction of Video Signals via Shift Vector Transmission", by F. Giorda et al.
ICC'79, Conference Record, vol. 2, "Interframe Television Coding Using Movement Compensation", by John D. Robbins et al.

*Primary Examiner*—Howard Britton
*Attorney, Agent, or Firm*—Blakely, Sokoloff, Taylor & Zafman

[57] ABSTRACT

A coded video signal transmitting and receiving system comprises in combination a coding apparatus using a plurality of prediction functions and provided for a transmitter, a decoding apparatus provided for a receiver, and a coded signal transmission path, whereby a coded video signal transmitted from the coding apparatus via the transmission path is received at the decoding apparatus and decoded thereby. In the coding apparatus, from a video signal received in time series, two dimensional blocks each consisting of a plurality of picture elements which extend over a plurality of scanning lines are formed, and the video signal is delivered out in a different sequence from that of the input time series. A predictive error value per block with respect to arbitrary one of the plurality of prediction functions associated with each block is generated, and a prediction function to generate a subsequent prediction error value is designated by use of part or all of prediction error values. An optimum prediction function selected from prediction functions is determined after a predetermined time has elapsed to generate prediction signals for picture elements in the two-dimensional block sequentially in accordance with the optimum prediction function. In coding the input video signal, at least a signal representative of the optimum prediction function and the prediction error signal are compressed and transmitted via the transmission path to the decoding apparatus in which the compressed code signal is expanded for decoding.

9 Claims, 31 Drawing Figures

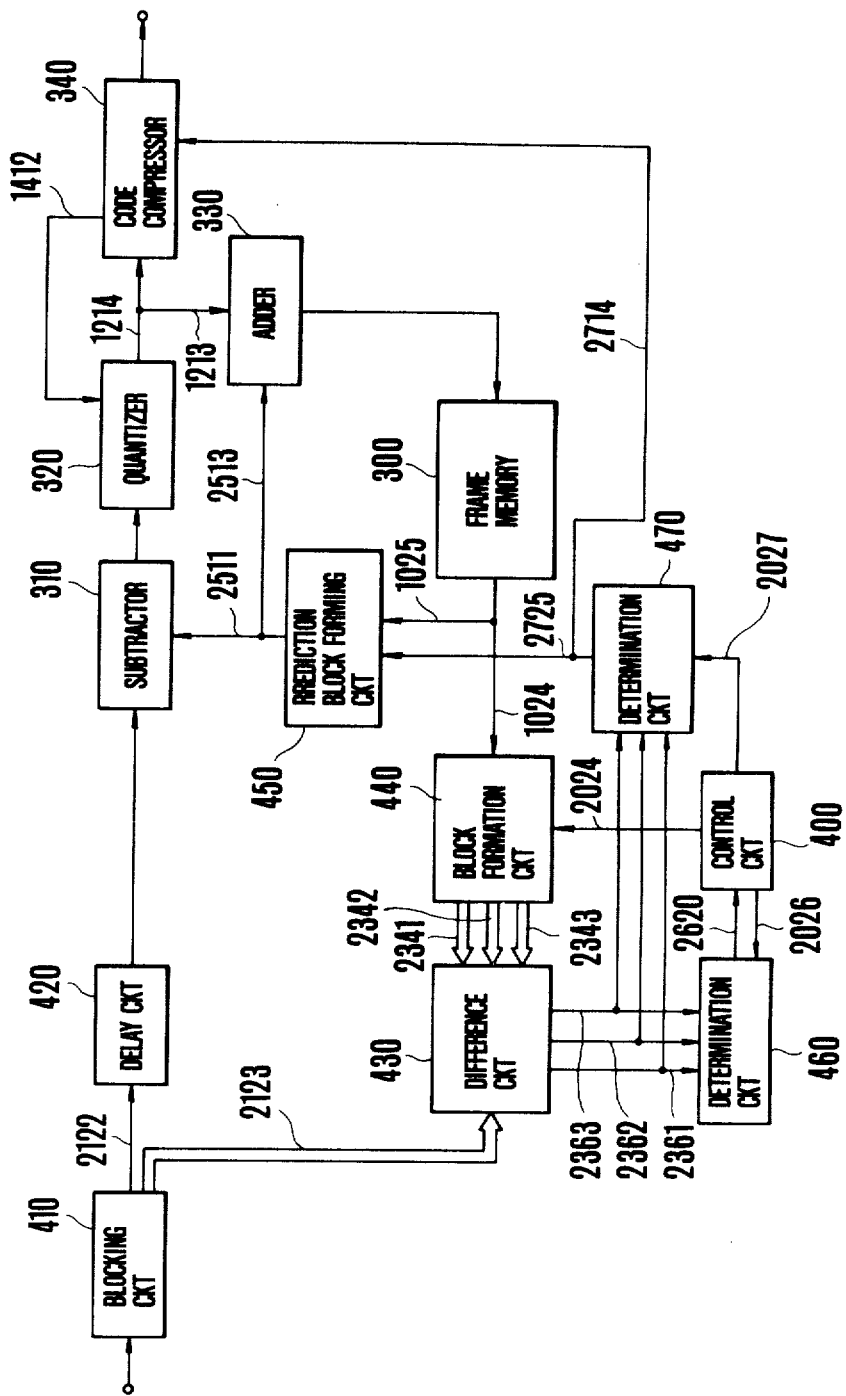
F I G. 16

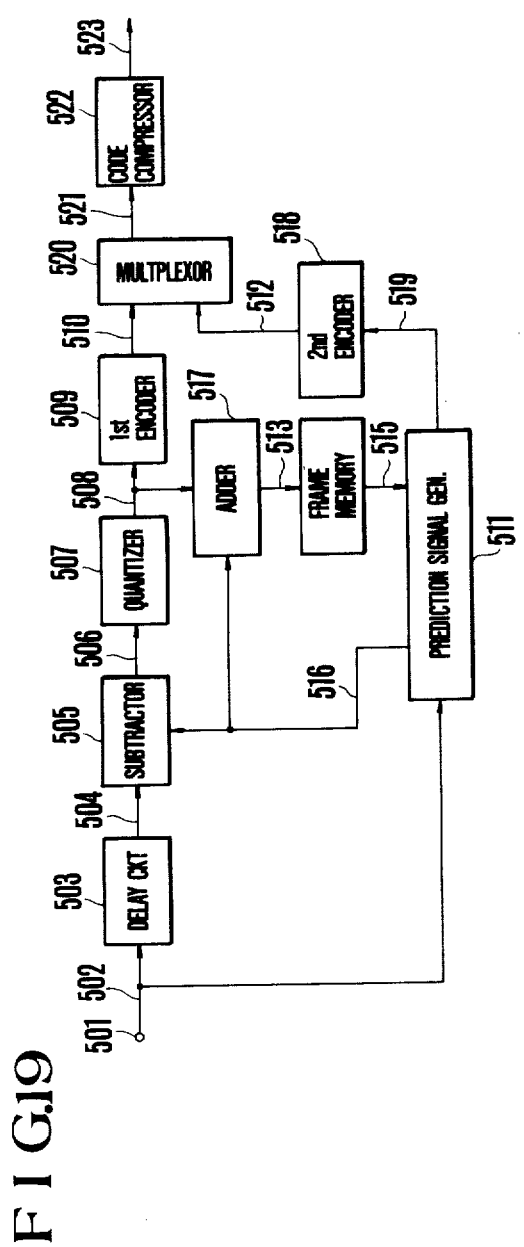
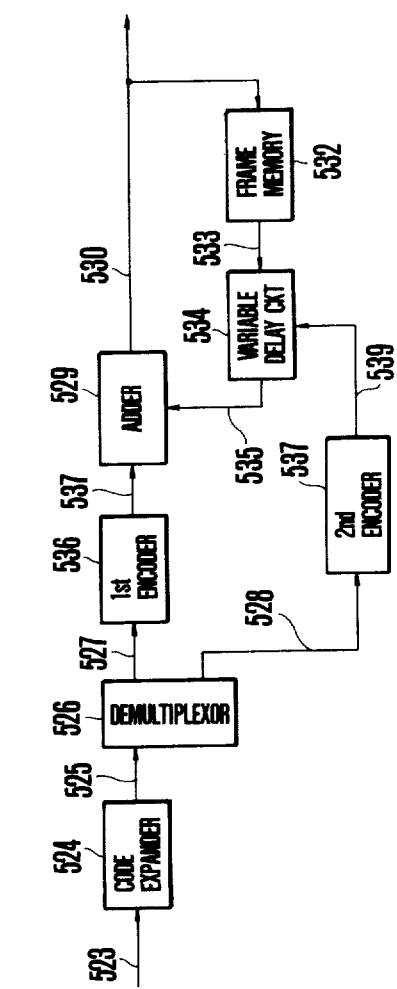
FIG.19
FIG.20

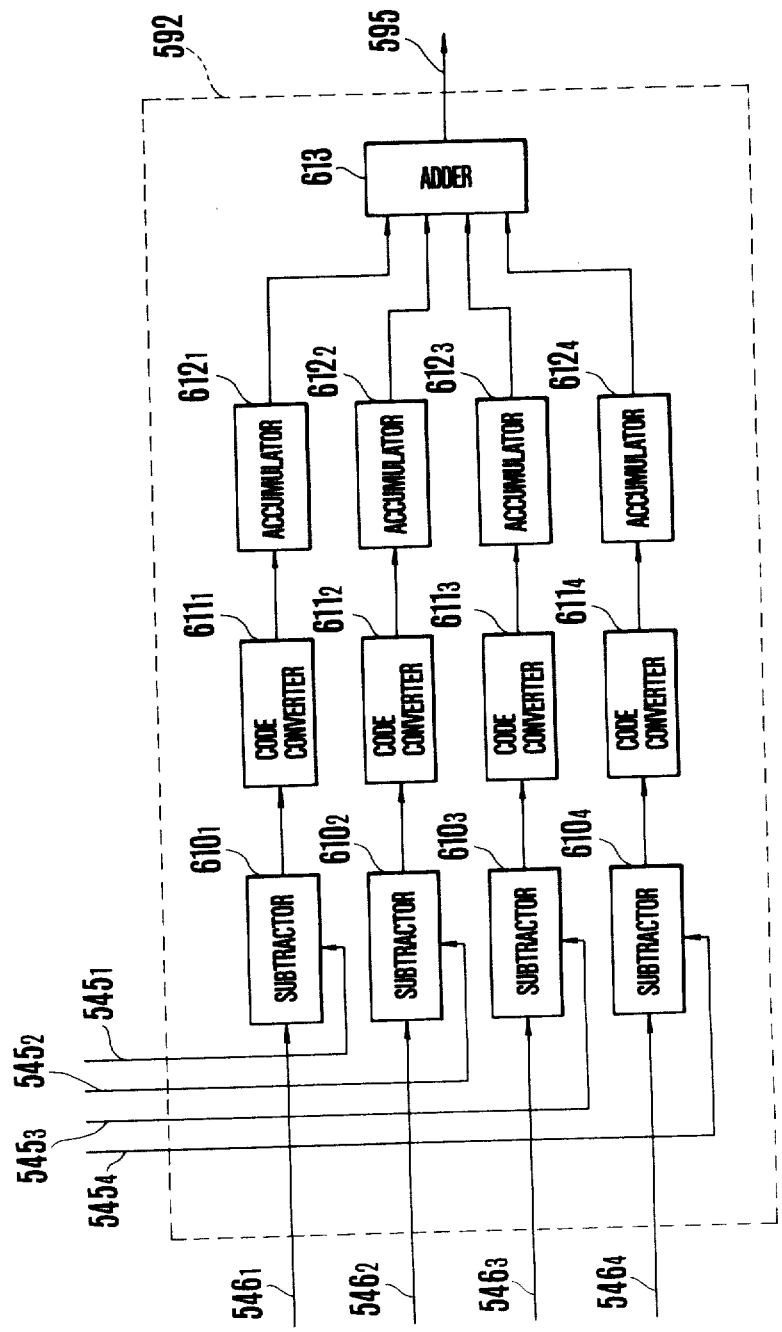
F I G.25

CODED VIDEO SIGNAL TRANSMITTING AND RECEIVING SYSTEM

BACKGROUND OF THE INVENTION

The present invention generally relates to a coded video signal transmitting and receiving system comprising in combination a coding apparatus using a plurality of prediction functions and provided for a transmitter, a decoding apparatus provided for a receiver, and a coded signal transmission path. Predictive coding applicable to the predictive system has been developed on the basis of the principle that the amount of information to be transmitted can be reduced by transmitting the difference between the input signal to be transmitted and its predicted value. The present invention is concerned in particular to a predictive system using a great number of predicted values. In a picture signal transmission system such as for television broadcasting, the prediction error having a large magnitude does not occur frequently for motionless pictures and quasi-motionless pictures in inter-frame coding, for example, and less information is satisfactory. On the other hand, the amount of information to be generated increases for pictures subject to much movement or displacement. Accordingly, in inter-frame coding, a higher coding efficiency can be obtained for pictures subject to less movement.

Many attempts have been done to enhance the coding efficiency for pictures subject to a substantive movement. A movement included in the television signal is mostly assumed to be a parallel movement, and realization of high coding efficiency for moving pictures has been attempted by performing interframe prediction in consideration of the amount of shift of an image between contiguous frames.

Now, let us consider that a figure located in the proximity of coordinates (x0, y0) at time $t = t0$ is assumed to move to (x1, y1) after one frame period ($\tau$). Since picture elements in a frame preceding by one are used for a prediction signal in the conventional inter-frame predictive coding, picture elements in the proximity of (x0, y0) at $t - t0$ are used for estimating picture elements in the proximity of (x0, y0) at $t = t0 + \tau$. Accordingly, if the difference value (prediction error value) is not zero, an updated figure will be generated at $t = t0 + \tau$ in proximity of points (x0, y0) and (x1, y1). If the amount of shift of the updated figure from (x0, y0) to (x1, y1) can somehow be detected, the updated figure in the proximity of (x1, y1) at $t = t0 + \tau$ can be predicted by use of the figure in the proximity of (x0, y0) at $t = t0$, resulting in a considerable reduction in the amount of information to be generated. This is the principle of so called "movement correction". In other words, the optimum prediction points for a figure in the proximity of (x1, y1) at $t = t0 + \tau$ are located in the proximity of (x0, y0) at $t = t0$. The optimum prediction point expressed as a function of time or spatial coordinates is called here an optimum prediction function. In general, an optimum prediction function is determined in block units each consisting of a number of picture elements, and the predictive coding is effected by using the detected optimum prediction function, so that the signal representing the optimum prediction function is transmitted together with the prediction error signal.

For determination of the optimum prediction function, there has been proposed, for example, a method in which the amount of prediction error (hereinafter, the prediction error power will be exemplified) is computed in parallel, in order to determine the function in the entire range corresponding to the rate of block correction within a limited time period. This method, however, requires very large scale and complex circuitries, and it is almost impossible to realize the system using practical hardware.

SUMMARY OF THE INVENTION

Accordingly, the present invention contemplats to solve the aforementioned problem in prior art, and it is a primary object of the invention to provide a coded video signal transmitting and receiving system with highly efficient and highly reliable, simplified predictive encoder and decoder.

Another object of this invention is to provide a highly efficient video signal predictive coding apparatus and an encoding apparatus cooperative therewith.

Still another object of this invention is to provide an improved prediction function designation unit for use in the video signal predictive coding apparatus.

According to general aspect of the present invention, there is provided a coded video signal transmitting and receiving system comprising in combination a coding apparatus using a plurality of prediction functions and provided for a transmitter, a decoding apparatus provided for a receiver, and coded signal transmission path means, whereby a coded video signal transmitted from the coding apparatus via the transmission path means is received at the decoding apparatus and decoded thereby, the coding apparatus comprising:

scan converter means which forms from a video signal received in time series two-dimensional blocks each consisting of a plurality of picture elements which extend over a plurality of scanning lines, and outputs the video signal in a different sequence from that of the input time series;

error signal generating means which generates a predictive error value per block with respect to arbitrary one of the plurality of prediction functions associated with each block;

prediction function designation means which designates a prediction function to generate a subsequent prediction error value by use of part or all of prediction error values which have been generated by the error signal generating means;

prediction signal generating means which determines an optimum prediction function selected from prediction functions produced from the prediction function designation means after a predetermined time has elapsed, and generates prediction signals for picture elements in said two-dimensional block sequentially in accordance with the optimum prediction function;

predictive coding means which performs predictive coding by use of said prediction signal and the video signal output from the scan converter means; and code compressor means which performs compression coding for at least a signal representing the optimum prediction function and the prediction error signal delivered from the predictive coding means, to produce a compressed predictive coding signal, the decoding apparatus comprising:

means which receives the compressed predictive coding signal sent from the coding apparatus via the transmission path means, for separating the compressed code by expansion into a signal representing the optimum prediction function and a corresponding prediction error signal;

means which receives a supplementary decoded video signal, for generating a prediction signal in accordance with a signal representing a prediction function separated by said separating means;

predictive decoding means which receives an output of the prediction signal generating means and a prediction error signal separated by the separating means, for generating said decoded video signal;

scan inverter means which transforms an output of said prediction decoding means into the video signal in said original time series.

BRIEF DESCRIPTION OF THE DRAWINGS

FIG. 16 is a block diagram showing the construction of the modified encoder.

FIGS. 19 and 20 are diagrams of encoder and decoder based on the detection of movement of FIG. 18;

FIGS. 21 through 26 are diagrams illustrating component elements used in the encoder and decoder of FIGS. 19 and 20;

DESCRIPTION OF PREFERRED EMBODIMENTS

Figure 1:
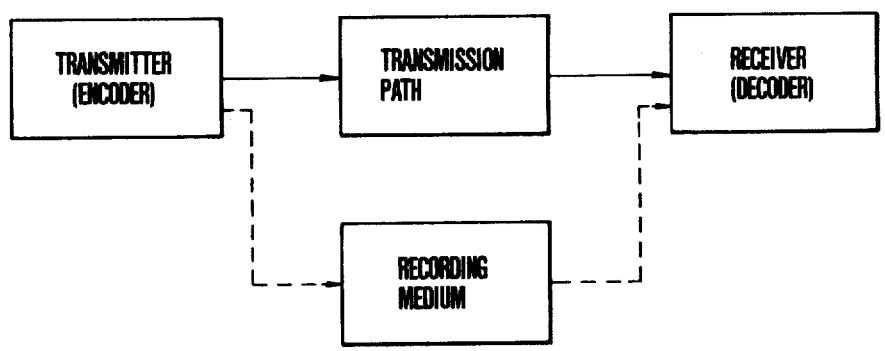
FIG. 1 is a block diagram useful in explaining the concept of a coded video signal transmitting and receiving system.

Referring to FIG. 1, there is shown an overall scheme of a coded video signal transmitting and receiving system. One manner of utilization of a coded video signal is such that, as shown at solid line, an output code from an encoder incorporated in a transmitter is transmitted via a transmission path to a decoder incorporated in a receiver and decoded thereat. The transmission path may include conductive wiring lines or a spatial transmission path. In another manner of utilization, a coded video signal is once stored in a storage or a recording medium and thereafter read out into a decoder as shown at dotted line in FIG. 1. The present system is particularly directed to the former scheme.

Foundation and features of the invention will first be described briefly.

Figure 2:
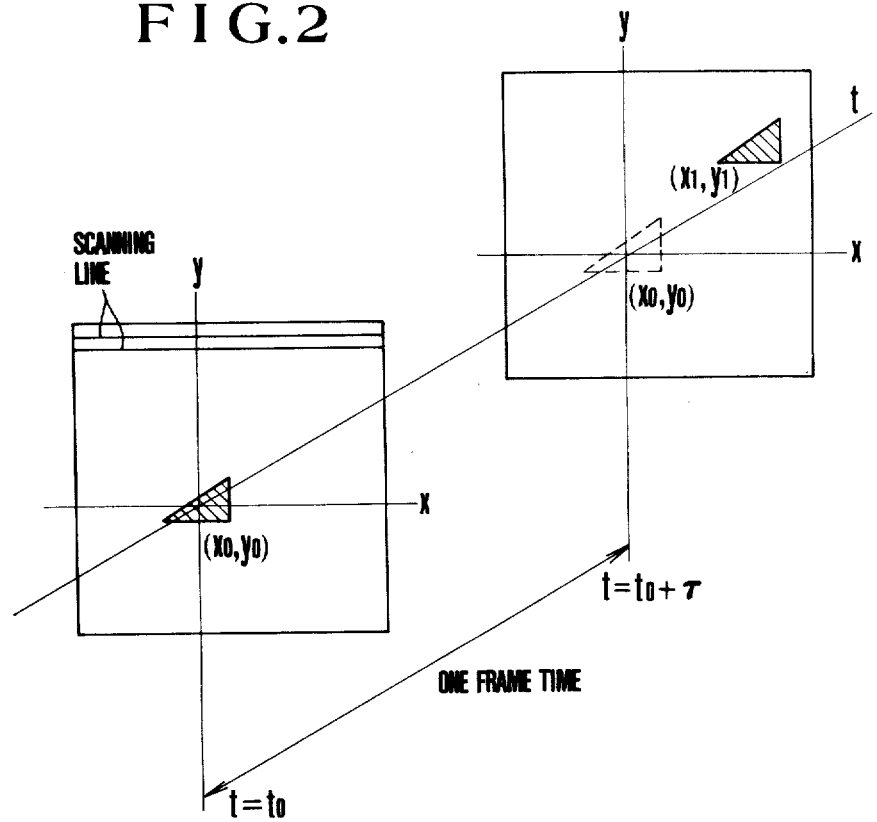
FIG. 2 is an illustration useful for explaining the principle of movement correction for a figure.

With reference to FIG. 2, it is assumed that the scanning line runs in X-direction and sweeps in y-direction, and that a figure (hatched) associated with coordinates (Xo, Yo) at $t=t0$ shifts to coordinates (X1, Y1) one frame period after time to, i.e., at $t=t0+\tau$. Further, the moving rate of an object to be corrected in the x-direction is assumed to be $\pm m$ picture elements per one frame period, and that in the perpendicular y-direction be $\pm n$ lines per one frame period. In this case, the number of vectors indicating the rate and direction of the movement is $2m+1$ in the x-direction, $2n+1$ in the y-direction and $N=(2m+1)\times(2n+1)$ in total, where m and n are integers. The number of vectors signifies the number of prediction functions to be prepared. Here is an image which moves at a rate of Vx picture elements per one frame period in the x-direction and Vy lines per one frame period in the Y-direction, where Vx and Vy are values within the range of correction, that is, $-m \leq Vx \leq m$
$-n \leq Vy \leq n$ stand. Thus, prediction at a location shifted by $-Vx$ in the x-direction and $-Vy$ in the y-direction from a corresponding point in the previous frame minimizes and optimizes the prediction error power P. Therefore, the prediction function expressed by use of the vector $(-Vx, -Vy)$ is the optimum prediction function, and is called here the shift vector.

Figure 3:
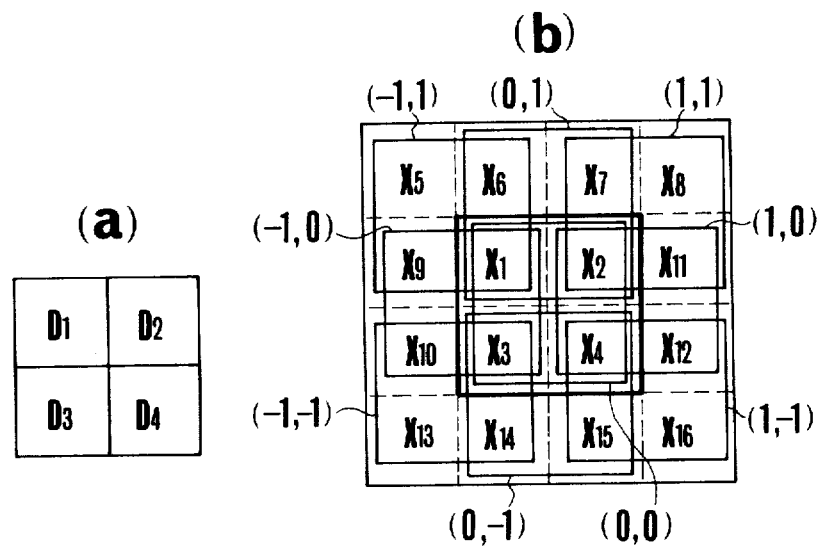
FIG. 3 illustrates in sections (a) and (b) the arrangement of picture elements in an input picture block and the arrangement of picture elements used for prediction, respectively.

In order to compute a prediction error power P (the squared difference value) in block units to find the optimum prediction function at a high speed, it is effective to carry out computation in parallel for signals which can be processed concurrently. For example, in computing a prediction error power P for determining a moving vector, parallel processing is possible (A) wherein N parallel computations are carried out, N being the range for the movement correction or (B) wherein M parallel computations are carried out, M being the number of picture elements within a block. The following describes an example of a block consisting of four picture elements (i.e. $M=4$). FIG. 3 shows at section (a) the arrangement of picture elements D1 to D4 in the block of the input picture to be predicted, and shows at section (b) the arrangement of picture elements at $m=n=1$ used for prediction and arranged in two-dimensional coordinates so as to perform the movement correction efficiently. In Fig. 3 at section (b), symbols (0,0), (1,0), . . . , (−1, −1) denote prediction vectors. For example, (0,0) signifies a point in the previous frame, (1, −1) signifies a point which is shifted by one picture element to the right and one line downward from point (0,0). The foregoing computations (A) and (B) carried out for prediction vector (1, −1) will now be explained in detail. For process (A), nine computations $(D1-X5)^2$, $(D1-X6)^2$, $(D1-X7)^2$, $(D1-X9)^2$, $(D1-X1)^2$, $(D1-X2)^2$, $(D1-X10)^2$, $(D1-X3)^2$, and $(D1-X4)^2$ are carried out concurrently, which are followed by similar computations for D2, D3 and D4.

For process (B), four computations $(D1-X4)^2$, $(D2-X12)^2$, $(D3-X15)^2$, and $(D4-X16)^2$ are carried out concurrently, which are followed by computations for remaining eight prediction vectors. Accordingly, the total number of computations is $4\times 9=36$ for processes (A) and (B). Thus, the number of computations needed to determine the optimum prediction function is $M\times N$ for both processes (A) and (B).

In executing the parallel computation by hardware, any one of $(D1-X5)^2$, $(D1-X6)^2$, ..., $(D1-X4)^2$, $(D2-X12)^2$, ... is carried out by one arithmetic unit. The result of computation is assumed to be Pij, where i represents a picture element in the block and j represents one of prediction functions. For process (A), Pij are computed in parallel for $j=1, 2, 3, \ldots, N$, then for $i=1, 2, 3, \ldots, M$. Accordingly, it is necessary to memorize values $$\sum_{i=1}^{M}$$

Pij for each j so as to compare and determine the minimum prediction error power for the block. For process (A), at least N arithmetic units, N accumulators for storing prediction error power and N comparators for prediction error values are necessary. For process (B), Pij are first added in parallel for $i=1, 2, 3, \ldots, M$ to obtain $$\sum_{i=1}^{M}$$

Pij, and the prediction error power is compared with that of another prediction function so as to determine a smaller one, requiring at most N-time comparisons. It means that the computation can be carried out repeatedly for N times using M arithmetic units and M input adders and comparators. In general, hardware can be minimized for repetition of the same computation by using the same arithmetic circuit repeatedly. In the case of process (A), computation is repeated for the number of picture elements M in a block, and hardware requirement is virtually determined from the number of vectors N.

The television signal which is a typical moving picture signal includes movements at various speeds. Assuming the range of movement correction to be 6 picture elements per frame horizontally and 6 lines per frame vertically, the number of vectors N becomes 169. On the other hand, the number M of picture elements in a block should be as small as possible, since the larger value of M, especially in the vertical direction, necessitates a large computational unit. In relatively large block made up of 8 lines by 16 picture elements, M is 128, and M<N holds.

For the predictive coding apparatus using movement correction, the range of correction, i.e., the number of vectors N, should preferably be as large as possible and the number of picture elements in a block be as small as possible. From this viewpoint, the method of (A) in which necessary hardware is determined by the value of N, and a large range of movement correction disadvantageously needs an increased hardware. In contrast, the method of (B) mainly uses M arithmetic units repeatedly for N times, and hardware requirement is virtually determined by the value of M. Thus, it can be seen that the method of (B) is much advantageous.

In addition, in processing the above-mentioned two-dimensional blocks, it is advantageous that the picture signal which has been transformed for scanning in advance is used. In this case, picture elements in a two-dimensional block across several scanning lines are rearranged, and picture elements in each block are transformed so that picture elements in one block continue to those in the subsequent block and all picture elements in a two-dimensional block are aligned serially. Accordingly, presence of scanning lines need not be cared when carrying out prediction coding for picture elements in a two-dimensional block, and a two-dimensional block can be treated identically to a one-dimensional block produced from M picture elements on a single scanning line. As can be seen from the above, when scan conversion is carried out in advance, predictive coding by use of two-dimensional blocks can be no more than predictive coding by use of one-dimensional blocks. According to the present invention, the above process (B) is achieved for determination of the optimum predictive function by repetitive use of M arithmetic units for N times, thus, hardware can be made small when the number of picture elements M included in a block is small. Moreover, the prediction error power for a block for each function can be obtained by single computation, allowing the selection of an prediction function to be compared next while carrying out the computation. It means that all of N-time computations are not always necessary for determining the optimum prediction function.

The present invention will now be described in detail by way of embodiments.

Figure 4:
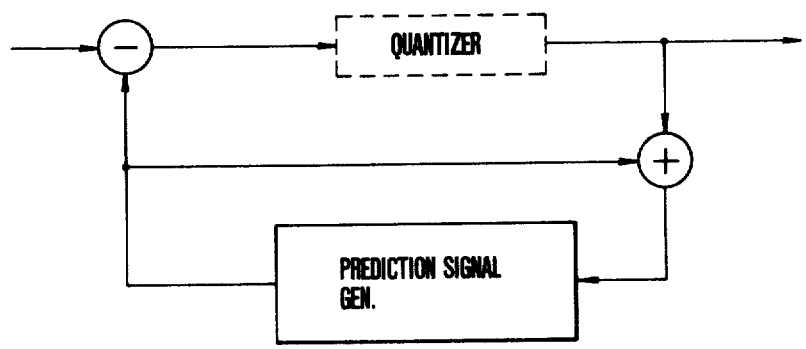
FIG. 4A is a block diagram showing the circuit arrangement of the transmission predictive coding apparatus.
FIG. 4B is a schematic block diagram of a typical predictive encoder.
Figure 4A:
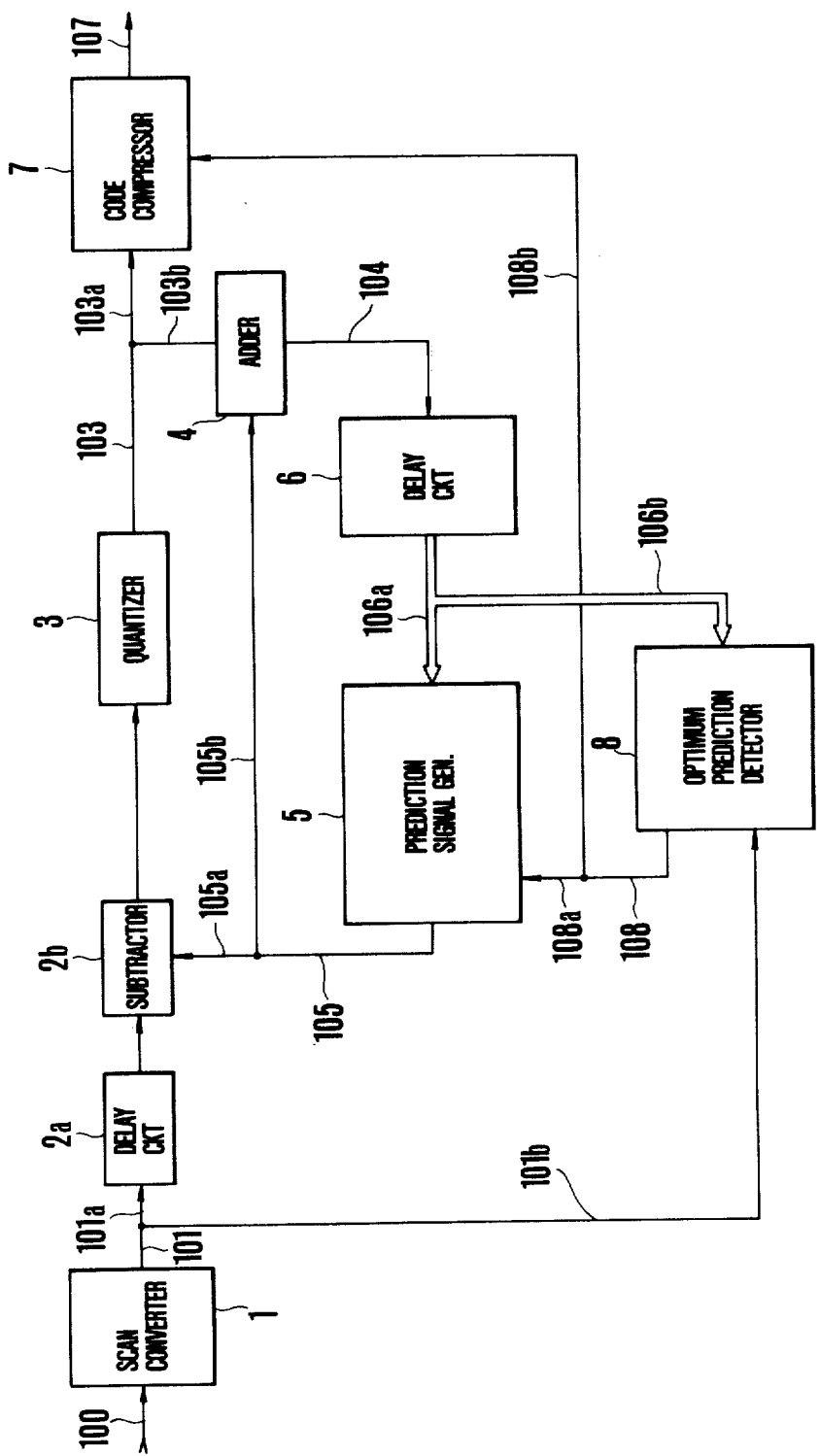

FIG. 4A is a block diagram showing an example of a predictive coding apparatus of a predictive system, which is located on the side of a transmitter and operates to transmit a signal to a predictive decoding apparatus on the side of a receiver. An input video signal is supplied via line 100 to a scan converter 1, in which a plurality of blocks each consisting of a number of picture elements are formed. The block-formation video signal is then supplied to a delay circuit 2a and an optimum prediction detector 8 via lines 101a and 101b, respectively, branched from line 101. The delay circuit 2a delays the propagation of the block-formation video signal for a length of time required for determining the optimum prediction function. The delay time is dependent on the number of picture elements included within a block. The video signal is supplied from the delay circuit 2a to a subtractor 2b, and here the difference between the picture signal and the prediction signal supplied via a line 105a branching from an output line 105 of an prediction signal generator 5 is produced, and the difference, i.e. the prediction error signal, is then supplied to a quantizer 3 which functions to limit the number of possible levels. The quantized prediction error signal is supplied via a line 103a branching from a line 103 to a code compressor 7. At the same time, the prediction signal output from the prediction signal generator 5 is supplied via a line 105b to an adder 4, and here it is added to the quantized prediction error signal supplied via a line 103b so that a locally decoded signal is generated. The locally decoded signal is supplied via a line 104 to a delay circuit 6 so as to be used for generating a subsequent prediction signal. The delay time of the delay circuit 6 is dependent on the prediction function used, and it is chosen in this embodiment as approximately one frame period. The output of delay circuit 6 is supplied to the optimum prediction signal generator 5 and optimum prediction detector 8 as the locally decoded signal via lines 106a and 106b, respectively. The prediction signal generator 5 generates a prediction signal by using the delayed local decoding signal supplied via line 106a and in accordance with information signifying the optimum prediction function supplied from the optimum prediction detector 8 via lines 108 and 108a, and the generated signal is called the optimum prediction signal as mentioned previously. Determination of the optimum prediction signal is carried out in block units, and predictive coding by use of the optimum prediction signal is carried out according to the result of the optimum prediction detection. The optimum prediction detector 8 determines the optimum prediction function by use of the block-formation input video signal and the delayed local decoding signal from delay circuit 6 supplied via lines 101b and 106b, respectively.

Information signifying the optimum prediction function determined as described above is supplied, at the same time, to the code compressor 7 via line 108b. The code compressor 7 performs compressing transformation so that information is expressed by a minimized number of codes by use of information signifying the optimum prediction function, the prediction error signal which is output from the quantizer circuit 3 when that optimum prediction function is used, and the synchronization signal which becomes necessary at the time of decoding. The transformed signal is then sent out via a line 107 to a transmission line or a storage medium. The code compressor 7 includes data rate matching function which permits compressed information to be output in a constant data rate.

In FIG. 4A, components as designated by 2b, 3, 4, 5 and 6 constitute a typical predictive encoder which can schematically be illustrated as shown in FIG. 4B. The provision of the quantizer as shown at dotted line is not essential.

Figure 5:
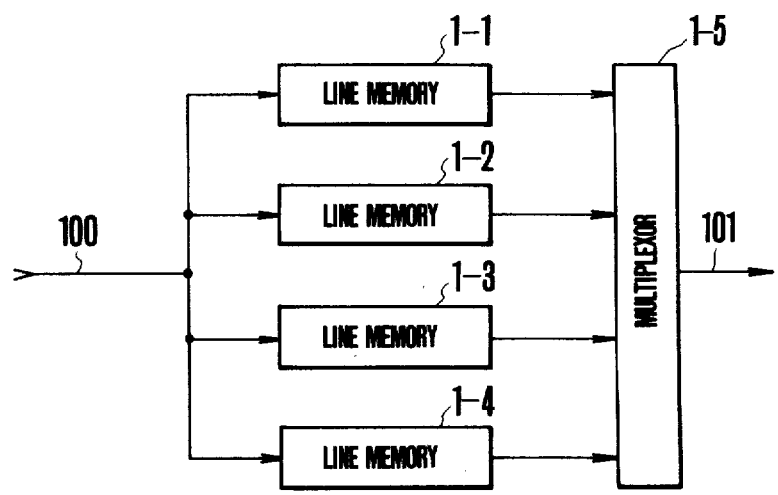
FIG. 5 is a block diagram showing in detail the scan converter of FIG. 4A.
Figure 6:
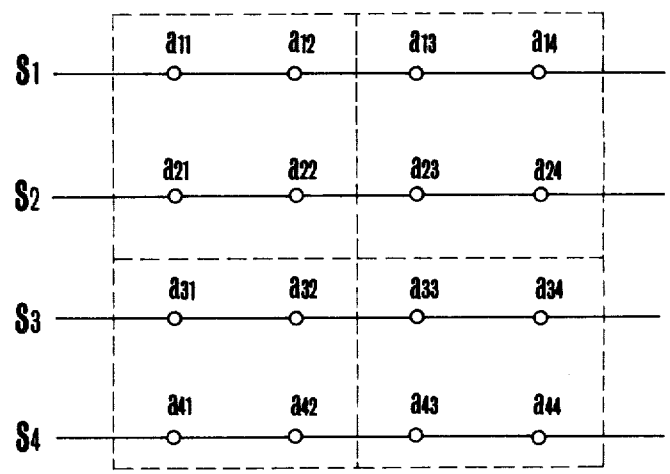
FIG. 6 is an illustration explaining the method of forming blocks for a scanning signal.

FIG. 5 is a block diagram showing in detail the scan converter 1 of FIG. 4A. In this embodiment, 2×2 two-dimensional blocks each consisting of two picture elements in the horizontal direction and two lines in the vertical direction, as shown in FIG. 6, are used. One block includes four picture elements, e.g. a11, a12, a21 and a22, enclosed by broken line. In a general television system, the screen is scanned from left to right in the order of, for example, a11, a12, a13 and a14, and elements a21, a22, a23 and a24 are included on the succeeding scanning line. Therefore, in the circuit of FIG. 5, a signal for scanning line S1 including picture elements a11 to a14 is stored in a line memory 1-1 and a signal for scanning line S2 including a21 to a24 is stored in a line memory 1-2 sequentially. Subsequently, when scanning lines S3 and S4 including a31 to a34 and a41 to a44 are stored in line memories 1-3 and 1-4, respectively, line memories 1-1 and 1-2 are read out in the order of blocks, that is, a11, a12, a21, a22, a13, a14, a23, a24, and so on. Since reading of scanning lines S1 and S2 in such converted form takes the same time as that for reading the scanning lines without scan conversion, S1 and S2 will have been read when the S4 line signal just been stored to the line memory 1-4. Then, the line memories 1-3 and 1-4 are read out in the above-mentioned converted form, while succeeding signals for scanning lines S5 and S6 are stored to the line memories 1-1 and 1-2 sequentially.

Line memory pair 1-1 and 1-2 and another line memory pair 1-3 and 1-4 are stored and read out alternately, so that the video signal which is rendered scan conversion i.e. converted into two-dimensional blocks, is output in a string of picture elements. One of two outputs from a line memory pair in reading operation is selectively output through multiplexor 1-5. The block-formation video signal on a line 101 from the multiplexor 1-5 braches to the lines 101a and 101b, then is supplied to the delay circuit 2a and optimum prediction detector 8, respectively. The above-mentioned scan conversion is advantageous since the predictive coding circuit using the two-dimensional blocks is simple. If any computation in two-dimensional block units were intended without use of the scan conversion, the video signal would be scanned in the order of a11, a12, a13, a14, and so on, in FIG. 6, and computation for a two-dimensional block including a11, a12, a21 and a22 must wait for picture elements a21, a22, a23 and a24 on the next scanning line, resulting in many blocks whose computations are left suspended until the next line is scanned. On the other hand, after scan conversion has been carried out, the video signal is arranged in the order of a11, a12, a21, a22, a13, a14, a23, a24 and so on, and computation for a two-dimensional block takes only four picture element periods such as for a11, a12, a21 and a22 or for a13, a14, a23 and a24, and generally M picture element periods. When scan conversion is carried out in advance, computation for each two-dimensional block becomes the same as that for a one-dimensional block including, for example, a11, a12, a13 and a14, thus greatly simplifying the computation control.

Figure 7:
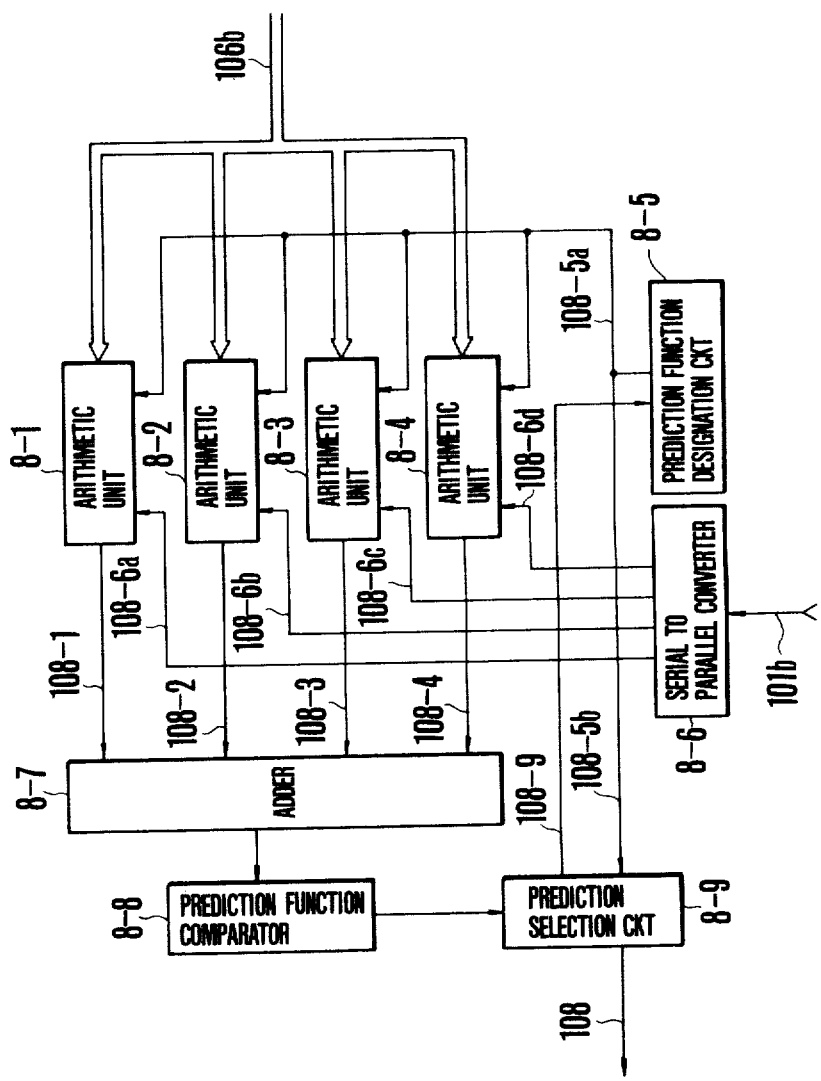
FIG. 7 is a block diagram showing in detail the optimum prediction detector of FIG. 4A.
Figure 8:
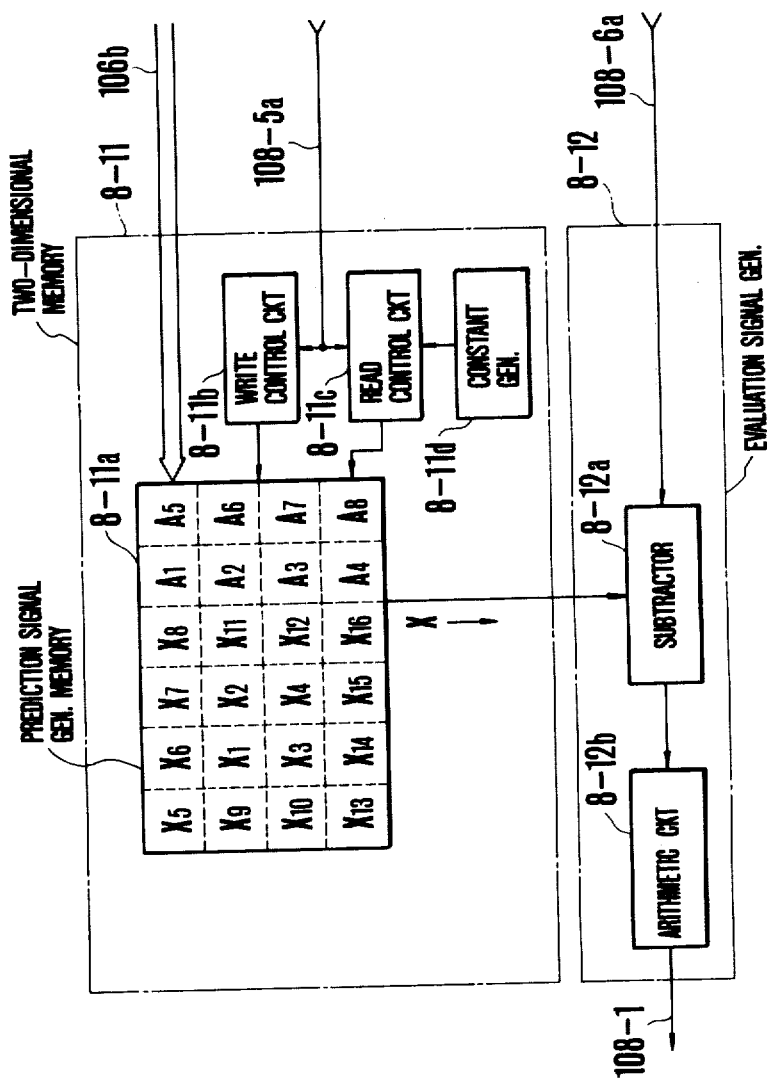
FIG. 8 is a block diagram showing in detail the arithmetic unit of FIG. 7.

FIGS. 7 and 8 are block diagrams showing in detail the optimum prediction detector 8 of FIG. 4A, and an arithmetic unit 8-1 shown in FIG. 7, respectively. As can be seen in FIG. 7, the output signal from delay circuit 6 supplied via the line 106b to the arithmetic unit 8-1 is temporarily stored in a prediction signal generator memory 8-11a within the arithmetic unit 8-1. The block-formation input signal is supplied via line 101b to a serial to parallel converter 8-6, and here four picture elements in a block, e.g. D1, D2, D3 and D4 of FIG. 3(a) are output in parallel. One of four parallel picture element outputs is supplied via line 108-6a to a substractor 8-12a within arithmetic unit 8-1. The position of a picture element processed by the arithmetic unit 8-1 will be called hereinafter picture element point D1 as shown in FIG. 3(a). Similarly, other arithmetic units 8-2 through 8-4 are used for computing picture element points D2 through D4, and a four arithmetic units in total are used in parallel for concurrent computations for one block.

The process will now be explained in detail for an example of the arithmetic unit 8-1 with reference to FIG. 8. The arithmetic unit 8-1 is mainly made up of a two-dimensional memory 8-11 and an evaluation signal generator 8-12. A two dimensional memory 8-11 consists of the prediction signal generator memory 8-11a, a write control circuit 8-11b which controls addressing of the memory for writing and reading the video signal and timing, a read control circuit 8-11c, and a constant generator 8-11d. The prediction signal generator memory 8-11a can be fabricated easily and in compact by employment of register files and RAMs (Random Access Memory). The write control circuit 8-11b operates to write the output signal from delay circuit 6 as a supplement video signal used for generating a prediction signal in the next block into a specified address of prediction signal generator memory 8-11a, and this address is determined by the prediction selection signal supplied from a prediction function designation circuit 8-5 of FIG. 7 via line 108-5a. The read control circuit 8-11c selectively reads one of video signals which are stored with the specific values given by the constant generator 8-11d to respective arithmetic units 8-1 through 8-4, in accordance with the prediction selection signal supplied from the read control. circuit 8-11c via line 108-5a. For example, if the prediction selection signal supplied via line 108-5a is the prediction vector (0, 0) in FIG. 3(b), the two-dimensional memory 8-11 in arithmetic unit 8-1 outputs X=X1 and the two-dimensional memories in arithmetic units 8-2 through 8-4 output X2, X3 and X4, respectively. This can be carried out easily by modifying the reading address (x, y) of prediction signal generator memory 8-11a, such that the address be (x, y) for arithmetic unit 8-1, (x+1, y) for unit 8-2, (x, y+1) for unit 8-3, and (x+1, y+1) for unit 8-4. In this manner, constant vectors (0, 0) (1, 0), (0, 1) and (1, 1) for address modification have been preset to the constant generator 8-11d for arithmetic units 8-1 through 8-4, respectively, and thus parallel computations for all picture elements within a block are carried out when the unitary prediction selection signal is supplied to arithmetic units 8-1 through 8-4. It can be seen that arithmetic units 8-1 through 8-4 having the same circuit arrangement can carry out respective computations merely by varying the value of constants in the constant generator 8-11d.

Assumption is made here that picture elements included in a block are disposed in a two-dimensional 2-by-2 array as illustrated in FIG. 6 and the range of movement correction for a block has a rate of +1 picture element per frame in the horizontal direction and +1 line per frame in the vertical direction as in the case of the movement correction range described in conjunction with FIG. 3. Then, in order to correct the movement within this range for this block, 16 predictions from X1 to X16 are necessary for 9 prediction vectors from (0, 0) which is mainly used for a stationary picture in the previous frame, (0, 1), (1, 0), ..., (−1, −1), as shown in FIG. 3(b). For example, when vector (0, −1) is used for prediction, a block to be predicted as X3, X4, X14 and X15 which is obtained by shifting zero picture element, i.e. not movement, in the horizontal direction and one line downward, e.g. a block including all, a12, a21 and a22 as shown in FIG. 6 is computed. When vector (1, −1) is used for prediction, computation is carried out for X4, X12, X15 and X16. Thus, 16 prediction signals are necessary for the above-mentioned movement correction range.

Assuming that a block which needs to be predicted at this moment, e.g. the block including all, a12, a21 and a22 in FIG. 6, is separated by one frame period from a block including X1, X2, X3 and X4, there are 16 prediction signals from X1 through X16 when the movement is corrected for all, a12, a21 and a22, since one block has a width of two picture elements in the horizontal direction. There are also 16 prediction signals for the subsequent block including a13, a14, a23 and a24, and they are X2, X4, X7, X8, X11, X12, X15, X16, and A1 through A8. Therefore, during predictive coding using movement correction for the block of all, a12, a21 and a22, eight picture elements, A1 through A8, which are necessary for the next block must be supplemented. Supplement of A1 through A8 for the prediction generator memory 8-11a is carried out by supplying the output of delay circuit 6 via line 106. If an equal time, e.g. four picture elements periods, is assigned to each of reading and supplementing, it is necessary to supplement two picture elements at one picture element period or time so that eight picture elements are stored within the given time. Therefore, the line 106b must be arranged such that two picture elements can be supplied concurrently. The number of parallel lines for line 106b is determined from the number of picture elements (M) constituting a block, the shape of the block, the range of movement correction, and the time (T) allowed in determining the optimum prediction signal. For example, in the case of a block having k picture elements in the horizontal direction and L lines in the vertical direction, i.e. M=k×L, with the range of movement correction |Vx|≦m and |Vy|≦n, the allowable time T is not more than the periods of total picture elements M. When predictive coding for the input video signal is desired to be carried out in real time processing, the number of supplementary picture elements k(2n+L) necessary for determining the optimum prediction function for the next block must be supplied within time T. In the previous example, where k=2, L=2, m=n=1, the number of supplementary picture elements is 2×(2×1+2)=8. In order to supply k(2n+L) picture elements within the M picture element periods, the number of parallel lines required for supplement becomes k×(2n+L)/M, that is, 2×(2×1+2)/(2×2)=2. In other example, where k=8, L=4 and m=n=6, the number of parallel lines required is 8×(2×6+4)/(8×4)=4.

The address of prediction signal generator memory 8-11a for writing the above-mentioned supplementary picture elements is preferably next to the addresses for storing picture elements which are necessary for determining the optimum prediction function for the current block, for facilitating read/write control. For this purpose, A1 through A8 are written following the addresses for storing X1 through X16 as shown in FIG. 8. The necessary storage capacity of the prediction signal generator memory 8-11a is expressed, using symbols k, L, m and n, as (2m+k)×(2n+L) for determining the optimum prediction function of the current block, kx(2n+L) for supplementary picture elements for determining the optimum prediction function of the next block, amounting to 2(m+k)x(2n+L) in total.

Prediction signal X which is selectively output from the prediction signal generator memory 8-11a is subtracted from the video signal supplied via line 108-6a by a subtractor 8-12a, and the difference is further computed in the squaring operation such as (a11-X3)² by an arithmetic circuit 8-12b when it is desired to be expressed in terms of the prediction error, e.g. the prediction error power, and the result is output via a line 108-1. Similarly, the results of computations in arithmetic units 8-2 through 8-4 are output via lines 108-2 through 108-4, respectively. Computation of the prediction error will be explained by way of example where the prediction error power is used as the prediction error.

Referring again to FIG. 7, a prediction signal is selected by the prediction selection signals for arithmetic units 8-1 through 8-4 supplied from the prediction function designation circuit 8-5 via line 108-5a, then difference signals between the video signal supplied via line 106b and the prediction signals are generated. The result of the squaring operation for the difference signals is supplied to an adder 8-7 via respective lines 108-1 through 108-4. The adder 8-7 performs addition for four inputs. When prediction vector (0, −1) is used, for example, $(a11-X3)^2+(a12-X4)^2+(a21-X14)^2+(a22-X15)^2$ is carried out, and the result of addition is supplied to prediction function comparator 8-8. The result of addition, i.e. the prediction error power for each block corresponds to one prediction function (or shift vector) which has been specified in the order predetermined by the prediction function designation circuit 8-5, and prediction function comparator 8-8 compares the result of addition and that of the previous prediction function so as to find and retain a smaller result to be compared with the result of addition in the succeeding prediction function. When the result of addition smaller than retained one is supplied to the prediction function comparator 8-8, the retained result is replaced with the smaller result, and at the same time, a replacement signal indicating the occurrence of replacement is supplied to the prediction selection circuit 8-9. On receiving the replacement signal, prediction selection circuit 8-9 holds a shift vector supplied from the prediction function designation circuit 8-5 via line 108-5b. If there are so many prediction functions that the optimum prediction function cannot be determined within the specified computation time when performing the above computation for all prediction functions, some prediction functions are sampled for computation. Then, an approximate optimum prediction function is determined, and the same process is carried out for some other prediction functions having similar shift vectors as that of the approximate optimum prediction function. By repeating this process, the optimum prediction function in all prediction functions can be obtained through a small number of computations. Information indicating an approximate optimum prediction function becomes accurate gradually as the processing is repeated, and it is fed back to prediction function designation circuit 8-5 via line 108-9. The prediction designation circuit 8-5 designates some prediction functions sequentially for comparison in the next repetitive processing by use of a fed-back approximate optimum prediction function.

Figure 9:
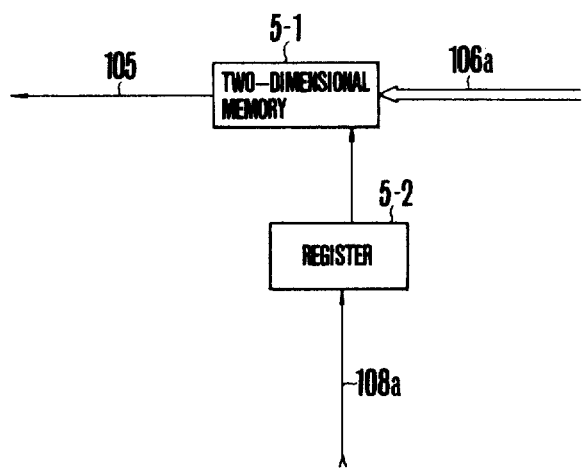
FIG. 9 is a block diagram showing in detail the prediction signal generator of FIG. 4A.

FIG. 9 is a block diagram showing in detail the prediction signal generator 5 in FIG. 4A. In the figure, a two-dimensional memory 5-1 has substantially the same structure as that of the two-dimensional memory 8-11 included in the arithmetic unit 8-1. The difference of these memories is that an internal prediction signal generator memory (not shown) receives an output from a register 5-2 which holds information signifying the optimum prediction function for one block period, and an internal read control circuit (not shown) reads out all picture elements in the block onto line 105 sequentially and automatically in accordance with the contents of the information. A constant generator (not shown) included in the two-dimensional memory 5-1 is preset to (0, 0) identically to the constant generator 5-11d in FIG. 8, and if (0, −1), for example, is the prediction vector corresponding to the optimum prediction function, X3, X4, X14 and X15 are obtained sequentially as the optimum prediction signals on line 105. While outputting the optimum prediction signal, it is necessary for the two-dimensional memory 5-1 to supplement prediction signal generator memory 5-1a with a local coding signal supplied via line 106a, in order to generate the optimum prediction signal for the next block. The method of supplement is the same as that for the prediction signal generator memory 8-11a in the foregoing arithmetic unit. Accordingly, the prediction signal generator 5 is slightly expanded for the function of the read control circuit as compared with arithmetic unit 8-1.

The range of movement correction as described above by way of example is by no means limited by the type of prediction function or the number of picture elements included in a block, and if, for example, the range of movement correction is +6 picture elements per frame and +6 lines per frame in the horizontal and vertical directions, respectively, (the number of types of prediction function is 169), and the number of picture elements in one block is 4 lines × 8 picture elements, i.e. 32 picture elements, the optimum prediction function can be obtained by repeating the computation in circuit 8 for determining the optimum prediction function for a maximum of 169 times using 32 arithmetic units. When the optimum prediction function is determined in real time processing for a block including 32 picture elements, for example, it must be carried out within 32 picture element periods. Therefore, it is necessary to employ slightly different method of determining the optimum prediction function in this case, and such a method will be described later.

Figure 10:
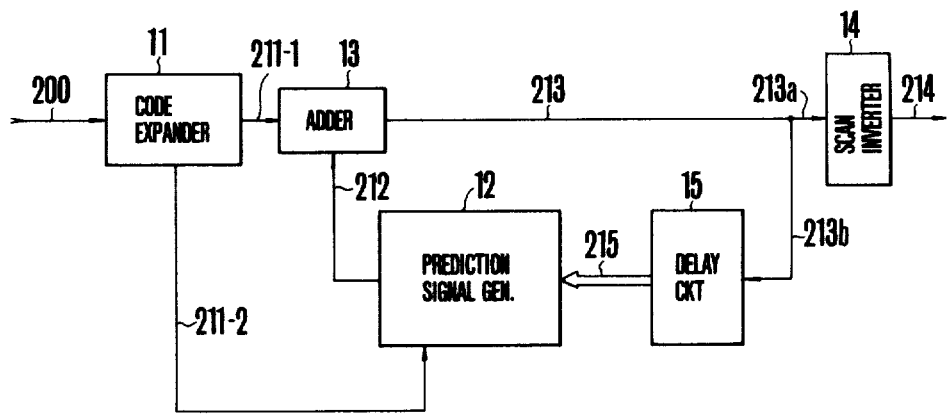
FIG. 10 is a block diagram of the predictive decoding apparatus embodying the present invention.

FIG. 10 is a block diagram showing an embodiment of the predictive decoding apparatus in accordance with the present invention. In the figure, the video signal which has been coded by prediction by means of the predictive coding apparatus of FIG. 4A and provided with compressed information is supplied from a transmission path or storage medium via line 200, and it is separated by a code expander 11 into a sync signal which has been added by the code compressor 7 in the coding apparatus for reproduction of the original picture, information representing the optimum prediction function and a prediction error signal for the optimum prediction function. The expanded and separated information representing the optimum prediction function and prediction error signal are supplied to a prediction signal generator 12 and an adder 13 via lines 211-2 and 211-1, respectively. The prediction signal generator 12 generates the optimum prediction signal in accordance with information representing the optimum prediction function, and the function and structure of the generator are the same as those of the prediction signal generator 5 in the predictive coding apparatus. The generated prediction signal is supplied via line 212 to adder 13 and added to the prediction error signal supplied via line 211-1, so that a video signal is reproduced. The reproduced video signal is then supplied to a scan inverter circuit 14 and a delay circuit 15 via lines 213a and 213b branching from line 213.

The delay time of a delay circuit 15 is the same as that of the delay circuit 6 in predictive coding apparatus and is about one frame period. The delayed reproduced video signal is supplied as the supplementary picture element signal to the prediction signal generator 12 via line 215, so that the prediction signal necessary for the next block is generated in the prediction signal generator 12. The number of parallel lines for line 215 is determined by the number of picture elements included in a block, the shape of the block, the range of movement correction and time allowed to determine the optimum prediction function, as in the case of line 106a in the predictive coding apparatus. Since the reproduced video signal supplied from the adder 13 via line 213a is still block-formed and cannot be displayed correctly on a generally used monitor and display units. Therefore, the reproduced picture signal is transformed by the scan inverter 14 back to the video signal in original time series, then the decoded video signal is sent out on line 214.

As a variation of embodiments shown in FIGS. 4A and 10, the delay time of the delay circuit 6 for delaying the locally decoded signal is increased to about two frame periods for the case where the television signal having a color signal carrier with opposite color signal phases among lines, as seen in the NTSC color television signal, is supplied to the scan converter 1 as the input video signal. Consequently, the video signal which is delayed by two frame periods and the video signals which are delayed by about one frame and one field (e.g. 262 lines measured before scan conversion) through the intermediate taps of delay circuit 6 are supplied to the prediction signal generator 5 and optimum prediction detector 8 via lines 106a and 106b, respectively. Also in the predictive decoding apparatus in FIG. 10, the delay circuit 15 is set to delay two frame periods as in the case of delay circuit 6, and the video signals which are delayed by about two frames, one frame and one field are derived through the intermediate taps and supplied to the prediction signal generator 12 via line 215. By alteration of signal supply, a number of prediction functions for color television signal can be generated using picture element points which indicate the phase of the same colors signal sub-carrier.

In the circuit arrangement of FIG. 4A, the prediction signal which is output from the two-dimensional memory 8-11 in arithmetic unit 8-1 of the optimum prediction detector is obtained by the simplest method without use of such as interpolation for purposes of simplicity. However, a variation of embodiment which will now be explained includes means of interpolation.

Assuming that prediction signal X is produced by use of video signals X1 to X16, the prediction signal X is generically given as:

$$M = \sum_{i=1}^{16} \rho_i X_i$$

where $\rho_1$ to $\rho_{16}$ are the weighting factors for X1 to X16, respectively. In the case of FIG. 8, X=X1 is output for prediction vector (0,0), thus $\rho_1$=1, and the remainder are all zero. However, in many cases, the prediction error can be made small by use of interpolated values. For example, $X=\rho_1 \cdot X_1 + \rho_9 \cdot X_9$ or more complex functions can be considered for prediction vector (0,0). Here, interpolation for two video signals will be explained.

Figure 11:
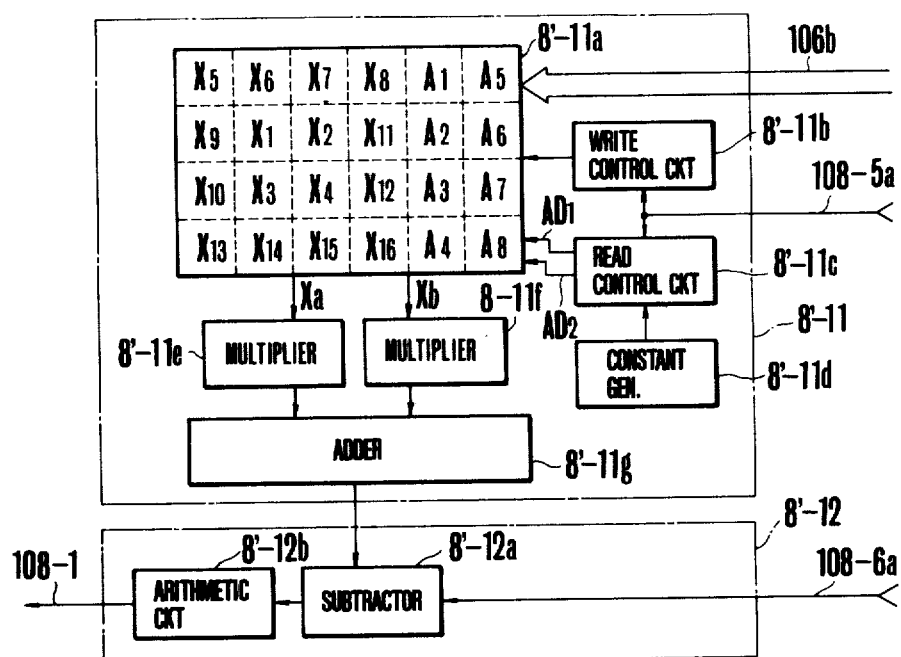
FIG. 11 is a block diagram showing a variation of the arithmetic unit of FIG. 8.

FIG. 11 is a block diagram showing an arithmetic unit 8'-1 (as an example of 8'-1 through 8'-4) which is arranged such that two video signals can be output in parallel from the prediction signal generator memory. In the figure, when the prediction vector is supplied via line 108-5a, a read control circuit 8'-11c indicates the address of two video signals to be read out, e.g. X1 and X9, concurrently to an prediction signal generator memory 8'-11a via lines AD1 and AD2. These two video signals are read out simultaneously and multiplication such as $\rho_1 \cdot X_1$ and $\rho_9 \cdot X_9$ are carried out by multipliers 8'-11e and 8'-11f. The multiplied values are added together by an adder 8'-11g, and the result becomes the output prediction signal X of a two-dimensional memory 8'-11. For example, when the predication vector is (0,0), the output signal from the arithmetic unit 8'-1 with intersame alteration for the two-dimensional memory in predication signal generator circuit 5, the interpolated result can be output on line 105. Other operations are the same as those of the case without interpolation.

Figure 12:
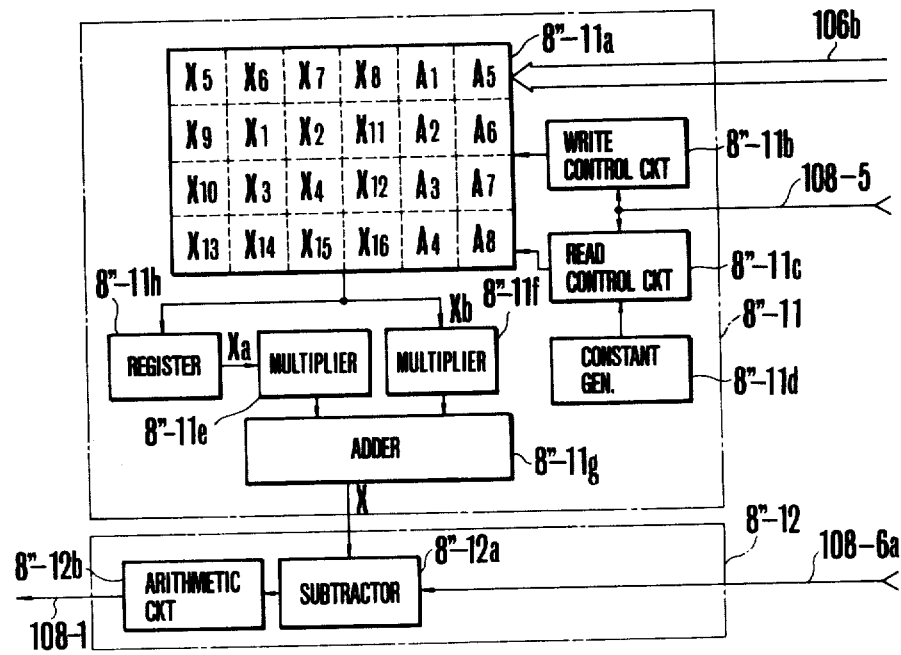
FIG. 12 is a block diagram showing another variation of the arithmetic unit of FIG. 8.

FIG. 12 is a block diagram showing a circuit arrangement of an arithmetic unit 8"-1 (as an example of 8"-1 through 8"-4) applied for a high-speed memory used for the predication signal generator memory. For example, when the memory speed is so high as to read out two video elements, the first read-out picture signal, e.g. X1, is stored in a register 8"-11h, then X9 is read out. An X1 (more generically, Xa) from a register 8"-11h and an X9 (more generically, Xb) which has been read out after X1 are supplied to multipliers 8"-11e and 8"-11f, and multiplied values $\rho_1 \cdot X_1$ and $\rho_9 \cdot X_9$ are output. An adder 8"-11g carries out addition $X=\rho_1 \times 1 + \rho_9 \times 9$. The two-dimensional memory in prediction signal generator 5 is also made up of a high-speed memory. The other operations are the same as the case of FIG. 8.

Figure 13:
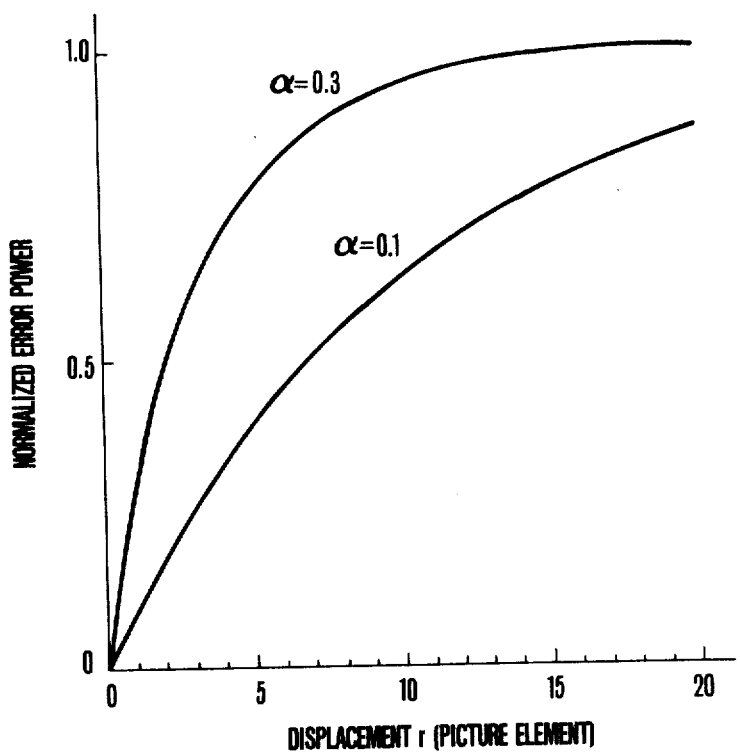
FIG. 13 is a graph useful to explain the statistical nature of the power difference of the television signal, indicating that the power difference of a pair of shifted pictures shows a monotoneous increase as the amount of displacement increases.

As a general feature of the television signal, the power difference computed by slightly shifting the same pictures can be given as a monotonous increasing function with respect to the amount of shift, and expressed as:

$$P=\overline{(f(R)-f(R+r))^2}=\overline{2f(R)^2}(1-e^{-ar})$$

where P, r and f(R) denote the power difference, the amount of shift and the brightness of the picture at point R, respectively. Term $1-e^{-ar}$ is the autocorrelation function of the television signal and constant $a$ is determined from the picture. Obviously, P is a monotonous increasing function of r, as shown in FIG. 13.

Accordingly, when considering the one-dimensional space, the direction in which the power difference P decreases sharpest, i.e. the direction of the steepest gradient line, can be known by comparing power differences obtained in at least two positions. In actual, a picture is displayed on the two-dimensional screen, and power differences at three positions are necessary to obtain the steepest gradient line.

In the following description, the power difference will be used as the error value.

Three position comparisons will now be described with reference to FIG. 14 in which shown are equi-power difference curves (each curve lies on positions having the same power difference) drawn in x-y coordinates. The assumption is made that there is a movement of an image in one frame period in the direction toward the bottom right as shown by broken line in the figure.

(1) First, three points (A, C and B) are plotted on origin 0 and on the x and y axes in the current frame, so as to evaluate the power differences a, c and b obtained from the differences between the present blocks represented by the points and those of the previous frame. Because of the monotonous increase in power difference P relative to a shift or displacement r, a block corresponding to a farther point from an optimum prediction point (X) has a larger power difference.

Accordingly, in comparing the inter-frame power differences among a of a block corresponding to origin O (i.e. point A) and b and c of blocks corresponding to points B and C on the x and y axes, these power differences are found to be b<a<c. In order to find the steepest gradient line using these three power differences and deduce the position of the optimum prediction point X for accurate approximation thereof, positions of three points A1, B1 and C1 used for the next detection are determined.

First, determination of the steepest gradient line will be explained.

Figure 14:
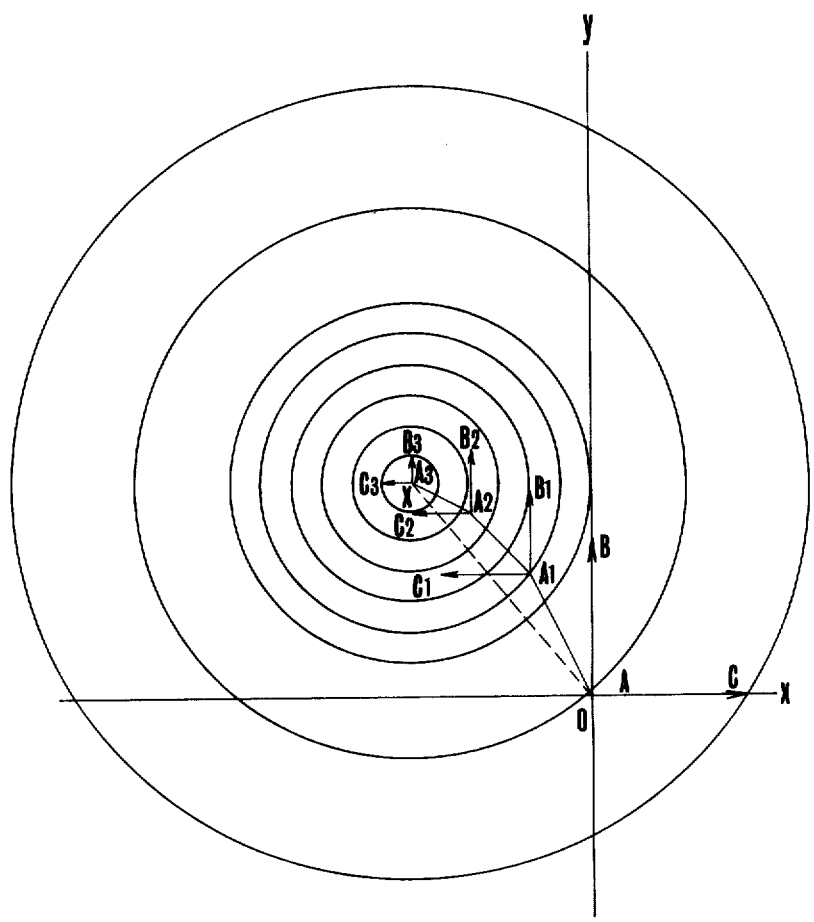
FIG. 14 is an illustration explaining the principle of a modified encoder according to the invention.

In FIG. 14, one of steepest gradient lines is line segment $\overline{OX}$. However, this line segment cannot be obtained at once, and therefore line segment $\overline{CX}$ connecting point C with point X is also considered to be an approximate steepest gradient line.

As shown in FIG. 14, if the optimum prediction point X resides within the region between the extensions of line segments $\overline{CB}$ and $\overline{CO}$ (i.e. x axis), line segment $\overline{CX}$ can be obtained from three power differences a, b and c.

Figure 15:
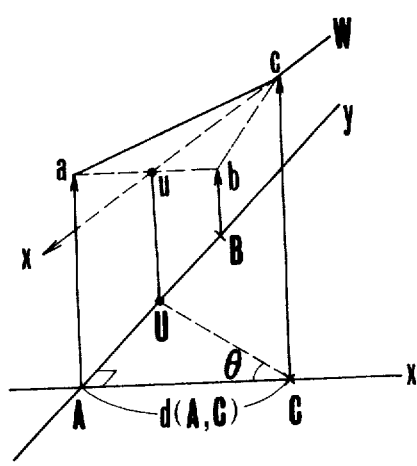
FIG. 15 is an illustration showing in detail the pinciple of FIG. 14.

This example will further be explained with reference to FIG. 15. Three line segments perpendicular to the x-y plane having lengths in proportion to inter-frame power differences a, b and c of the blocks corresponding to points A, B and C are set up on the points A, B and C, respectively, and the top (end point) of these line segments are also called a, b and c. Then, the steepest gradient line W passing through point c and included in a triangle abc which is defined by points a, b and c will across point u which lies between a and b on line segment $\overline{ab}$. Point u is located on point U, and can be obtained using the value of a, b and c. For example, expressing the distance between points A and C as d(A, C), the gradient of $\overline{ac}$ and $\overline{bc}$ are (c-a)/d(A, C) and (c-b)/d(B,C), respectively. The gradient of $\overline{uc}$ is given by the formula:

$$(c-u)/d(U,C) = ((c-a)\cos\theta + (a-b)\sin\theta))/d(A,C) \quad (1)$$

where $\theta$ is the angle between line segments $\overline{AC}$ and $\overline{UC}$.

The value of $\theta$, when line segment $\overline{uc}$ overlaps on the steepest gradient line W, is obtained as follows:

$$(c-u)/d(U,C) = \max\ (c-a)/d(A,C), (c-b)/d(B,C) \quad (2)$$

Formula (2) indicates that the gradient of line segment $\overline{uc}$ must be larger than each gradient of line segments $\overline{ca}$ and $\overline{cb}$. And, line segment $\overline{uc}$ expressed by $\theta$ which satisfies formula (2) and makes the left term of formula (2) (i.e. formula (1)) maximum will overlap on line W. When the value of a, b and c is given, the value of $\theta$ which makes formula (1) maximum is determined.

The value of $\theta$ making formula (1) maximum is expressed in the following formula:

$$0 = \frac{\pi}{2} - \alpha \quad (3)$$

where $\alpha = \arctan((c-a)/(a-b))$.

An example will be given for explaining how to obtain $\theta$. Assuming that values of a, b and c are in the relationship:
a:b:c: = 1.5:1.0:2.366
The value of $\theta$ which makes formula (1) maximum can be obtained by formula (3) as:

$$\begin{aligned}\alpha &= \arctan((2.366 - 1.6)/(1.5 - 1.0)) \\ &= \arctan 1.732 \\ &\approx \pi/3\end{aligned}$$

Accordingly, $$\theta = \frac{\pi}{2} - \frac{\pi}{3} = \frac{\pi}{6}$$

This means that the direction in which the power difference decreases sharpest is 30 degrees above and left of point C (assuming the +y direction to be north and +x direction be east in FIG. 14, this direction is northest by west).

As shown in FIG. 13, a small shift near the optimum prediction point causes relatively large power difference, and using this relationship, if values of c-a and c-b are large enough, point A is found to be located near the optimum prediction point X, and conversely, if they are small, it is far from point X. Therefore, three points used for detection in the next step are set along the direction of steepest gradient line W and near point A in the former case and slightly far from point A in the latter case.

Then, three points A1, B1 and C1 for the next step are determined using values of a, b and c. Spatial distances between points A1 and B1, and A1 and C1 should be determined smaller than distances between A and B, and A and C, respectively.

(2) It was found by comparing three power differences a, b and c in step (1) that the optimum prediction point is located in the above left direction seen from the origin. So, point C1 is plotted on the left of point A1, and point B1 is plotted above point A1. In the same way as in step (1), three points A2, B2 and C2 used in the next step are determined using inter-frame power difference a1, b1 and c1 of the blocks corresponding to points A1, B1 and C1.

(3) It can be seen in FIG. 14 that c1 is smaller than a1, and b1 is also smaller than a1, and moreover, the difference between b1 and c1 is small, indicating that the steepest gradient line points to the above left direction. Therefore, point A2 should be set on the above left of point A1. In this step, point A2 is already located near the optimum point X, and distances between A2 and C2, and A2 and B2 should be made smaller than those between A1 and C1, and A1 and B1 as determined in step (2), so as to improve the accuracy of detection.

Three points A3, B3 and C3 necessary for the detection of the next step are determined using values of inter-frame power differences a2, b2 and c2 of the blocks corresponding to three points A2, B2 and C2.

(4) Since c2 is smaller than a2, and a2 is nearly equal to b2, the optimum point X is presumably located on the left of line A2-B2 and on the bisector of line A2-B2.

(5) Point A3 is chosen on the bisector of line A2-B2 and on the left of line A2-B2. At the same time, points B3 and C3 are set. At this time, distances between points A3 and B3, and A3 and C3 become much smaller than those between points A2 and B2, and A2 and C2.

In comparing inter-frame power differences a3, b3 and c3 of the blocks corresponding to three points A3, B3 and C3 in FIG. 14, it is found that c3 is larger than a3, and b3 is larger than a3. Then, it can be seen that points B3 and C3 have passed over the optimum point X. The optimum point X is very close to point A3. When each of distances between A and B, and A and C is set to four picture elements in step (1) and it is reduced by one picture element interval at each comparison time, it will become one picture element interval, i.e. the minimum distance, at the fourth comparison time and point A3 then coincides with the optimum point X. It is also possible to take a2, b2 and c2 into account in addition to a3, b3 and c3 so as to further improve the accuracy of detection.

When the obtained block corresponding to the optimum point X i.e. the optimum prediction block, is used for predicting the block corresponding to the origin 0 (point A) of the current frame, the prediction error can be made smallest, and consequently, the coding efficiency can be made maximum.

FIG. 16 shows a block diagram of a coding apparatus based on the principle set forth above. The input television signal is first partitioned into blocks each having a predetermined size and including a plurality of picture elements by means of a block generating circuit 410 prior to the coding process. Each block may be a one-dimensional block consisting of picture elements which aligns in the horizontal scanning direction, or may be a two-dimensional block lying across a plurality of horizontal scanning lines. Here, explanation will be given for the two-dimensional block of L lines by k picture elements as an example.

The block-formed television signal is supplied to a delay circuit 420 in units of a picture element and to a difference circuit 430 in units of M picture elements via lines 2122 and 2133, respectively. The output of the delay circuit 420 is subtracted in a subtractor 310 by a prediction signal supplied from a prediction block forming circuit 450 via line 2511 in accordance with the position of the optimum prediction point determined by the method as will be described later. The difference of the signals, i.e. the prediction error, is then quantized by a quantizer 320, where the quantity of information is reduced due to the limited number of possible levels. The output signal from the quantizer 320 is supplied to a code compressor 340 and an adder 330 via lines 1214 and 1213, respectively. The adder 330 adds the prediction error signal from the quantizer 320 to a prediction signal supplied from the prediction block forming circuit 450 via line 2513 so as to produce a local decoding signal. The local decoding signal is stored in a frame memory 300 which stores approximately one frame of picture elements, so that it is used in the following prediction signal generation.

The code compressor 340 arranges the order of the vertical and horizontal sync signals, the quantized prediction error signal and information about its screen position, information about the position of the optimum prediction point for each block, information about specification of several quantizing characteristics if they are used in inter-frame coding, and coding parameters necessary for reproducing the television signal by the receiver.

The code compressor 340 also monitors the quantity of information to minimize the fluctuation of the quantity of information generation by the feedback control, such that a fine quantization characteristic is used when the quantity of information is small and a coarse quantization characteristic is used when the quantity of information is large. The control signal for this purpose is supplied to the quantizer 320 via line 1412.

The operation for detecting the optimum prediction point for each block by block formation circuit 440, difference circuit, determination circuit 460 and control circuit 400 will be explained.

In order to detect the optimum prediction block by means of the control circuit 400, two or three blocks (three blocks in this embodiment) are designated using the coordinates of locations or equivalent information through line 2024. The block formation circuit 440 outputs in parallel picture elements for the designated three blocks concurrently with M picture elements. The output picture element information for the three blocks are subtracted concurrently in difference circuit 430 by the input television signal supplied in units of M picture elements in parallel via line 2123, and the difference is squared, then it is integrated for all picture elements within the block. The difference circuit 430 operates for subtraction, squaring and accumulation functions, as will be explained below.

Figure 17:
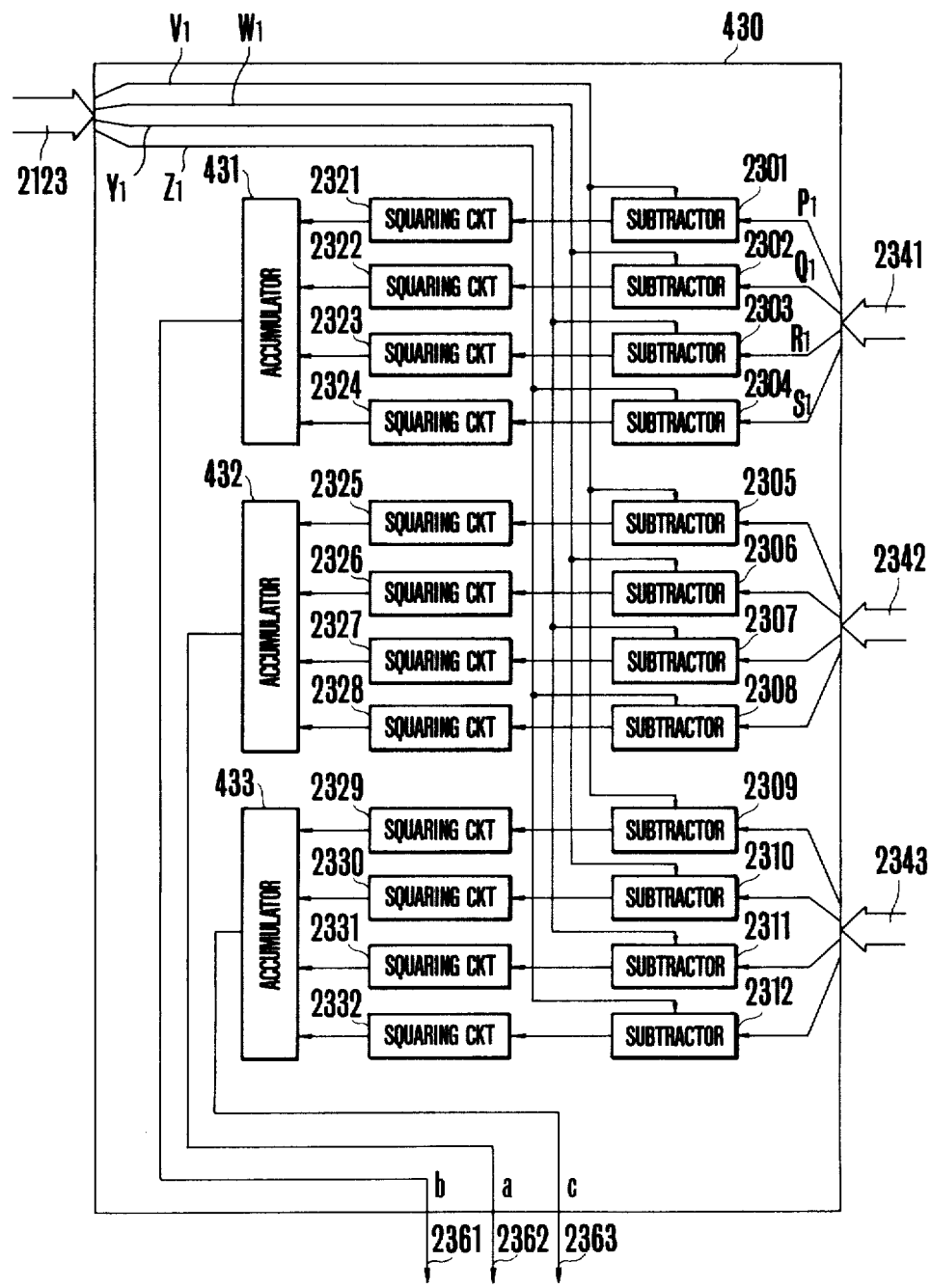
FIG. 17 is a block diagram showing in detail a part of the construction of FIG. 16.

Input signals to the differential circuit 430 shown in FIG. 17 are supplied via lines 2123, 2341, 2342 and 2343. The picture element information supplied via the four lines are transferred in parallel in units of M picture elements (here, M=4) so as to minimize the detection time, and subtraction and squaring are carried out in parallel.

FIG. 17 shows the circuit for the case of M=4. Four picture elements P1, Q1, R1 and S1 transferred in parallel via line 2341 are subtracted in subtractors 2301-2304 by four picture elements V1, W1, Y1 and Z1 in the input signal transferred in parallel via line 2123. Subtractions are carried out for pairs of picture elements, each located at the same spatial position in each block. Assuming that V1 and P1 are the leading picture element in each block, subtraction V1-P1 is executed. Subtractions are carried out identically for remaining pairs W1 and Q1, Y1 and R1, and Z1 and S1. The four subtraction results are then squared by respective squaring circuits 2321 to 2324, and their four outputs are accumulated in accumulators 431 to 433. Subtraction, squaring and accumulation are carried out N times for each block, and the number of accumulated picture elements is generically expressed as M×N.

Picture element information transferred in parallel via lines 2324 and 2343, and picture elements of the input signal block are subjected to subtracting, squaring and accumulating processes. Subtractors 2325-2328 and 2329-2332 function identically to subtractors 2321-2324. Accumulators 432 and 433 function identically to 431. Outputs b, a and c of respective accumulators are supplied via lines 2361-2363 to the determination circuit 460.

The determination circuit 460 made up of ROM (Read Only Memory) is initialized (point A is placed on the origin) prior to the first detection by control circuit 400 via line 2026, and in the following detection, evaluates the outputs b, a and c from accumulation circuits 431, 432 and 433 so as to designate three positions used in the subsequent detection. This is carried out in such a manner that, for example, the next point A1 is set at the top of vector r based on point A which has given the output a, then points B1 and C1 are set at the positions spaced by mx and my in the x and y directions. Accumulation results a1, b1 and c1 are obtained in the same procedure, and positions of points A2, B2 and C2 used for the next detection are designated in accordance with the evaluation results. These operations are repeated for a specified number of times.

Generation of the vector $\vec{r}$ will be explained below. First, the direction (θ) of the vector will be described. If, at the first detection time, values of a, b and c have the relationship, a:b:c = 1.5:1.0:2.366, θ will be equal to π/6, as obtained from formulas (1) and (3). Therefore, if the value of θ has been computed for various combinations of a, b and c, and stored in ROM with the address specified by the value of a, b and c, the value of θ can be obtained directly from a, b and c without the need of computation at each time. The magnitude of vector $\vec{r}$ (mx and my) can also be stored in ROM in advance. Since distances among points A, B and C are varied depending on the number of detection, the address should reflect the number of detection, so that the magnitude of vector $\vec{r}$ can be obtained correctly at each detection time.

Next, control for detecting the optimum prediction point by means of control circuit 400 will be explained.

First, the assumption is made that the maximum speed of movement to be corrected is n picture elements per frame. In the first detection for one block, three points are plotted, e.g. one in the previous frame and two on the x and y-axes each spaced by n picture elements in the positive direction from the first-mentioned point. Then, point B at "1 frame +n lines", point A at "1 frame" and point C at "1 frame—n picture elements" are chosen.

Power differences among three blocks in a preceding frame and an input signal block is necessary, and control circuit 400 transmits coordinates of each point, e.g. (0,0) that signifies the previous frame, (n,0) or (0,n) that signify preceding n picture elements or preceding n lines in the previous frame, respectively, to the block formation circuit 440. The block formation circuit 440 forms three blocks having time differences of "1 frame +n lines", "1 frame interval" and "1 frame—n picture elements" for the input signal block. Then, power differences b, a and c are obtained for these three blocks as described above, and the determination circuit 460 determines points A1, B1 and C1 for use in the second comparison from the gradient of the plane including these three points.

The control circuit 400 supplies information about positions of points A1, B1 and C1 for the second detection to block formation circuit 440. As the same operations are repeated, distances among three points are reduced, so that the detection result converges onto the optimum prediction point X.

The maximum number of repetition allowed for this detection is "time for the number of picture elements in a block divided by time required for one detection". Determination of the optimum prediction block at the time when the specified number of repetition have completed is carried out by the determination circuit 470. Outputs of difference circuit 430, i.e. a, b and c, a1, b1 and c1, and so on, are supplied to the determination circuit 460 and also to determination circuit 470, and when it receives the repetition completion signal from control circuit 400 via line 2027, it determines the optimum prediction block from three power differences obtained in the last repetitive operation. At this time, a block which gives the minimum power difference is assumed to be the optimum estimation block. The coordinates of the determined optimum prediction block is supplied to the prediction block formation circuit 450 and code compressor 340 via lines 2725 and 2714, respectively.

The above-described embodiment may be modified as below.

The squaring circuits 2321-2332 in difference circuit 430 function to square difference values, and these circuits may be replaced with absolute circuits, since a similar effect is obtained and the circuit can be made simpler. Therefore, accumulators 430 to 433 function to accumulate absolute values.

Further, the squaring circuits 2321-2332 in difference circuit 430 may be replaced with circuits which compare absolute difference values with a threshold value and present the result of comparison in one-bit codes. For example, each circuit is arranged to generate "1" when the difference value is larger than the threshold value, otherwise "0". Then, the one-bit codes are accumulated in accumulators 431 to 433. In this case, accumulation results correspond to power differences in the previous modification.

Moreover, error values in all preceding repetitive operations may be used together in order that the determination circuit 270 performs more accurate determination. In this case, memories for storing error values and comparators will be required depending on the number of repetition. For example, when the operation is repeated for k times, registers for storing 3 (k-l) data are used for determining the optimum prediction block using 3 k data.

Moreover, the frame memory 300 shown in FIG. 16 may be replaced with a field memory.

In a specific application where the input television signal is the color television signal having a color signal sub-carrier, assuming that one frame consists of (2J+1) lines and the color signal sub-carrier inverts its phase on alternate scanning lines, the present invention can be used directly for the color television signal, provided that a two-frame memory is used for frame memory 300 in FIG. 16. This invention can also be applied to the color television signal when a field memory for storing J lines (J is an even number) or J-1 lines (J is an odd number) of picture elements is used for frame memory 300 in FIG. 16.

Needless to say, the power difference, the absolute difference value or the comparison result between the absolute difference value and a threshold value may be used as the error value also for the color television signal.

In television signals, since fairly large movements occur, there arises the necessity for computing evaluation functions on a significantly large number of shift vectors. The great volume of arithmetic operations consequently involved inevitably necessitates use of a system of large scale. For example, when the detection is to cover a movement within an area involving 8 samples and 8 horizontal lines, the aforementioned computation of evaluation functions is required to be performed on a total of 289 shift vectors $[=(2\times 8+1)\times(2\times 8+1)]$.

In accordance with the invention, the volume of necessary arithmetic operations can be reduced by performing the detection of moving or displacement vectors which are equivalent to optimum prediction functions in a multiple separate steps, as will be described below.

Figure 18A:
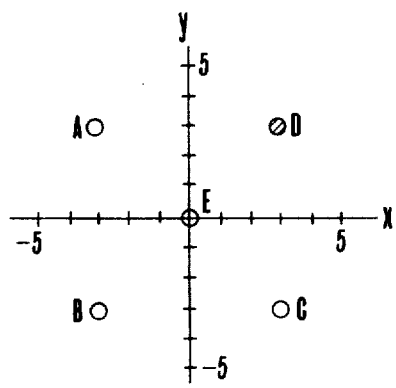
FIGS. 18A, 18B and 18C illustrate in sections a diagram for illustrating the detection of movement in the picture image according to a modified embodiment.
Figure 18B:
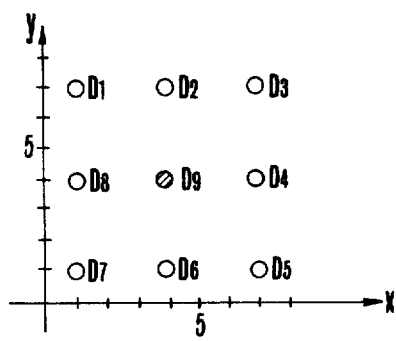
Figure 18C:
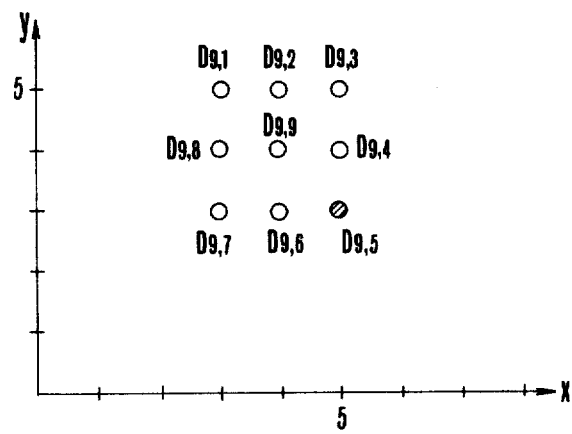

FIG. 18 illustrates in sections (a) through (c) a case wherein the detection of the moving or displacement vector is carried out in three separate steps. In FIG. 18, a shift vector $(V_x, V_y)$ which is equivalent to a prediction function signifies that the signal of the previous frame is shifted by $V_x$ samples to the right and by $V_y$ lines upwardly.

In the first step (section (a) of FIG. 18), values of the evaluation function are determined with respect to the first group of shift vectors denoted by A, B, C, D and E and, from among the shift vectors, a particular shift vector that gives a minimal evaluation function is singled out. It is now assumed, for example, that in the group of shift vectors A through E, the shift vector D gives the minimal value. Then in the second step (Section (b) of FIG. 18), the same calculation of the values of evaluation functions is performed with respect to the second group of shift vectors $D_1$ through $D_9$ which are positioned n the proximity of D and, from among the shift vectors $D_1$ through $D_9$, a particular shift vector which gives a minimal evaluation function is singled out. It is assumed that the shift vector $D_9$ gives the minimal evaluation function. Then, in the third step (section (c) of FIG. 18), the calculation of the values of evaluation functions is carried out on the third group of shift vectors $D_{9,1}$ through $D_{9,9}$ which are positioned in the proimity of $D_9$ and a particular shift vector that gives a minimal value of evaluation function is singled out. If the shift vector $D_{9,5}$ is found to give the minimal value of evaluation function, then $D_{9,5}$ is used as the moving vector or optimum prediction function for the block. At this point, a signal obtained by shifting the signal of the previous frame by the shift vector $D_{9,5}$ is used as an optimum prediction signal, and the difference signal between the optimum prediction signal and the signal of the present frame and the shift vector $D_{9,5}$ are encoded as a moving vector and, in that form, is transmitted.

The above description describes the encoding which is performed where the shift vector D gives the minimal value of evaluaton function in the first step. The detection of the moving vector is accomplished in the same manner even when another shift vector, different from D, gives a minimal value of evaluation function. Although the description has been given on the assumption that the detection is carried out in three separate steps, the procedure described above applies to without reference to any increase in a much more number of steps than above. While the conventional method requires the calculation of evaluation functions to be performed on more than 200 shift vectors, the manner as illustrated in FIG. 18 is only required to perform the calculation of evaluation functions with respect to a total of 23 shift vectors, namely 5vectors in the first step, 9 vectors in the second step and 9 vectors in the third step, thus permitting a significant reduction in the volume of necessary arithmetic operations.

Based on this principle, an inter-frame encoder as shown in block form in FIG. 19 and a decoder as shown in block form in FIG. 20 are materialized. In FIG. 19, a prediction signal generator 511, a second encoder 518 and a multiplexor 520 feature the encoder of this embodiment and in FIG. 19, a demultiplexor 526, a second decoder 537 and a variable delay circuit 534 feature the decoder of this embodiment. In the following description, therefore, only the part of the configuration which is peculiar to this embodiment will be dealt with in detail.

In FIG. 19, it is assumed that television signal which has undergone A/D (analog-digital) conversion (hereinafter referred to briefly as "TV signal" is received at a terminal 501. The TV signal is then coupled to a delay circuit 503 and the prediction signal generator 511. The delay circuit 503 is used for the purpose of timing the prediction signal issued from the prediction signal generator 511 and received via a signal line 516 with the TV signal sent from the terminal 501. The delayed TV signal which is issued by the delay circuit 503 and fed out through a signal line 504 is compared in a subtractor 505 with the prediction signal issued by the prediction signal generator 511 and fed out through the signal line 516. The resultant difference signal, that is, prediction error signal is fed through a signal line 506 to a qunatizer 507 for quantization. The quantized signal is fed through a signal line 508 to a first encoder 509 and an adder 517. Here, the first encoder 509 serves to encode the quantized prediction error signals by use of a set of variable word-length codes. The quantized prediction error signal which has been received in a signal line 508 is encoded and fed out to a signal line 510. In the meantime, the quantized prediction error signal is fed via the signal line 508 to the adder 517 at which it is subjected to local decoding by being added with the prediction signal issued from the prediction signal generator 511 on the signal line 516. The local decoding prediction error signal is sent through a signal line 513 and stored in a frame memory 514 to be used for causing the prediction signal generator 511 to issue a prediction signal with respect to the subsequent frame. Based on the input TV signal introduced via a signal line 502 and the signal of the previous frame, preceding by one frame, from the signal line 515, the prediction signal generator 511 carries out the aforementioned multi-step detection of movement and feeds out a prediction signal to the signal line 516. Besides, the prediction signal generator 511 gives a signal representing a moving vector found by the multi-step detection of movement to the second encoder 518 via a signal line 519. The second encoder 518 encodes the incoming signal by use of another set of variable word-length codes, for example, and feeds it out to a signal line 512.

The encoded moving vector or optimum prediction function which has been fed out to the signal line 512 is subjected to multiplexing in the multiplexor 520 with the encoded prediction error signal fed out to the signal line 510, and the multiplexed signal is fed to a signal line 521. The encoded signals in the signal line 521 is registered in a code compressor 522 to be timed by the speed of transmission in the transmission path. The signal thus registered in the code compressor 522 is read out at the speed of transmission and sent to a transmission path 523.

Now, the decoder will be described with reference to FIG. 20.

The signal fed out from the encoder to the transmission path 523 is written in a code expander 524 at the speed of transmission of the transmission path, then read out into a signal line 525 by the clock pulse of the decoder. In the multiplexor 526, a code representing the prediction error signal and that representing the moving vector are separated from each other and fed out to a signal line 527 and a signal line 582, respectively.

The code representing the prediction error signal is decoded by a first decoder and fed to an adder 529 via a signal line 531. In the meantime, the shifted signal for the previous frame which has been fed out of a variable delay circuit 534 via a signal line 535 is fed to the adder 529. As a result, the signals from the signal line 531 and the signal line 535 are put together and the TV signal is consequently decoded and fed out to the signal line 530. Besides, the signals on a signal line 530 are written in a frame memory 532, to be used for decoding the TV signal of the subsequent frame. Further, the signal which have been read out of the frame memory 532 is fed to the variable delay circuit 534 which will be detailed later, with the result that the aforementioned shifted signal of the previous frame is fed out.

In the meantime, the code representing the moving vector fed out from the demultiplexor 526 into the signal line 528 is decoded by the second decoder 537, fed out as shift control signal to a signal line 539 for connection to the variable delay circuit 534. The variable delay circuit 534 shifts the signals from the signal 533 in accordance with the shift control signal and sends it via the signal line to the adder 529. Consequently, the TV signal is decoded.

Figure 21:
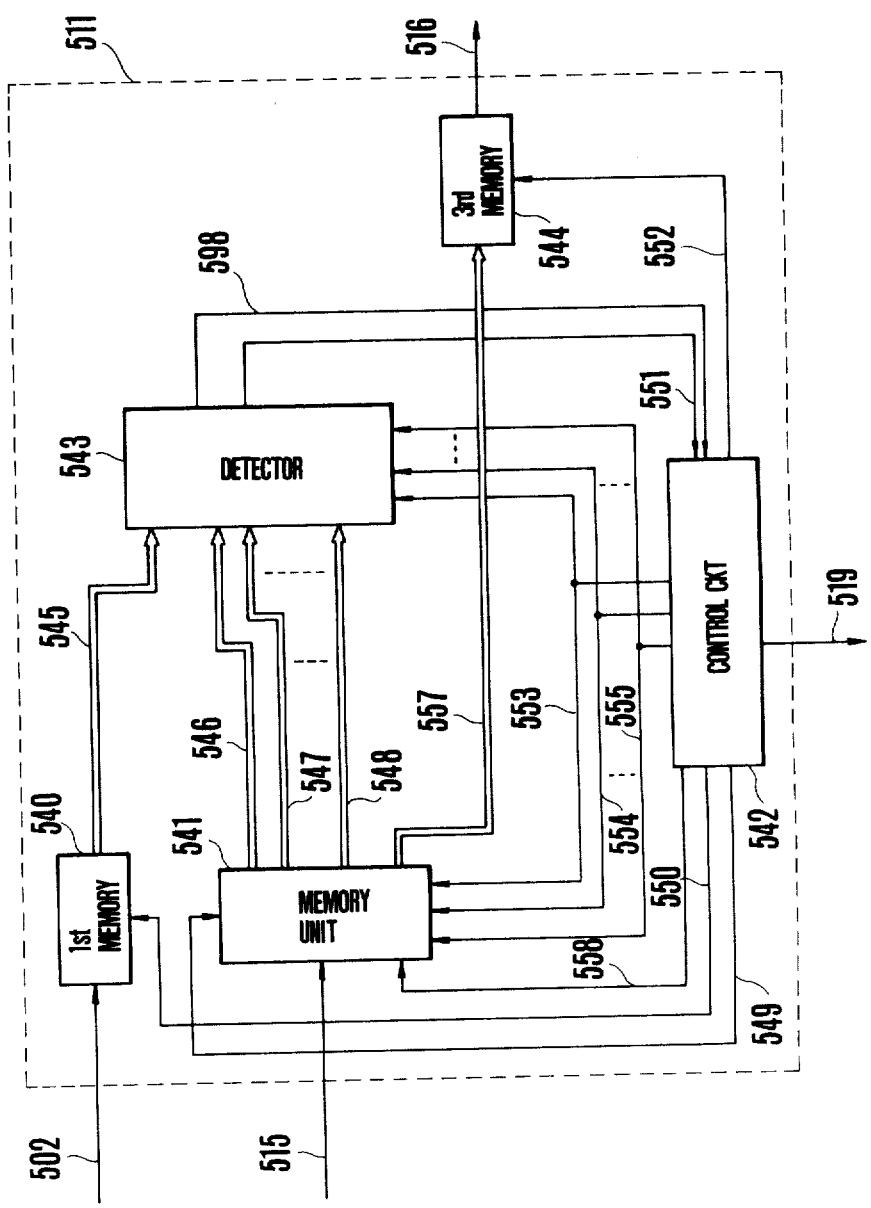

Now, the function of the prediction signal generator 511 will be described with reference to FIG. 21. The following description describes a case in which a plurality of horizontal scanning lines of TV signal are processed in parallel. The unit of this parallel processing conforms to the vertical size of the block (which is 8 in the present embodiment because the block size is configured to be (8 horizontal scanning lines) ×(16 picture elements). However, the parallel processing lines which conform the number of parallel processing units are indicated by one thick line such as a signal line 545 of FIG. 21 unless the individual scanning lines are required to be individually specified for the sake of description.

The TV signal received at the terminal 501 of FIG. 19 is stored in a first memory 540, read out of the memory parallelly by the vertical size of block (namely 8 lines) each time that each of the multiple steps of the detection is carried out, and fed out to the signal line 545.

Into a memory unit 541, the TV signal of the previous frame, preceding by one frame, is fed from the frame memory 514 via the signal line 515 and the shift control signals corresponding to the group of shift vectors obtained in the respective steps of the detection are fed from a control circuit 542 through signal lines 553 to 555 each time that each of the multiple steps of the detection is carried out. The memory unit 541 picks up the signals of the previous frame representative of positions on the TV screen which deviate from the positions corresponding to the block of the current or present frame in proportion to the shift control signals and delivers them to signal lines 546 to 548. Namely, the signal of the previous frame shifted in accordance with the shift control signal on the signal line 553 is fed to the signal line 546 and the signal of the previous frame shifted in accordance with the shift control signal on the signal line 554 is fed to the signal line 547. The same applies to the signal lines 555 and 548.

On the basis of the signals of the present frame fed via the signal line 545 and a group of signals, fed via the signal lines 546 to 548, which are shifted by the amount corresponding to the shift vectors in each step of the detection of movement, a detector 543 calculates the evaluation function values in the step, with respect to the shift vectors fed via the signal lines 553 to 555 to find the shift vector capable of minimizing the evaluation function, and sends the selected shift vector as well as a minimal function value via signal lines 551 and 598, respectively, to the control circuit 542. Where the control circuit 542 determines the shift vectors for the subsequent step solely in accordance with the shift control signals fed via the signal line 551, it is no longer necessary to feed the minimum value to the control circuit 542. The case in point will be described below. The control circuit 542 sends to the signal lines 553 through 555 the shift control signals representing the group of shift vectors for the subsequent step belonging to the shift vectors fed via the signal line 551, and also sends the memory addresses to the first memory 540 and the memory unit 541 via signal lines 550 and 549, respectively, to start the detection of movement in the subsequent step.

Further, at the time that the detection of movement in the last step is completed, the control circuit 542 sends the shift vector fed from the detector 543 via the signal line 551 and involving the minimized evaluation function, in their unmodified form, to the signal lines 519 and 558 and, at the same time, delivers addresses via the signal line 549 to the memory unit 541 and sends to a signal line 557 the signals which have been shifted from the signals of the previous frame in accordance with the moving vectors, for delivery thereof to a third memory 544. At the same time, the control circuit 542 sends addresses via a signal line 552 to the third memory 544, with the result that prediction signal is written in the third memory 544. From the third memory 544, the prediction signal is read out and fed via the signal line 516 to the subtractor 505 and the adder 517 of FIG. 19. On completion of the operation described so far, the control circuit 542 sends to the signal lines 553 to 555 the shift control signals corresponding to the shift vectors of the first step, sends the addresses of the next block via the signal lines 549 and 550 to the first memory 540 and the memory unit 542 to initiate the detection of moving vectors with respect to the next block and the issuance of prediction signals.

Figure 22:
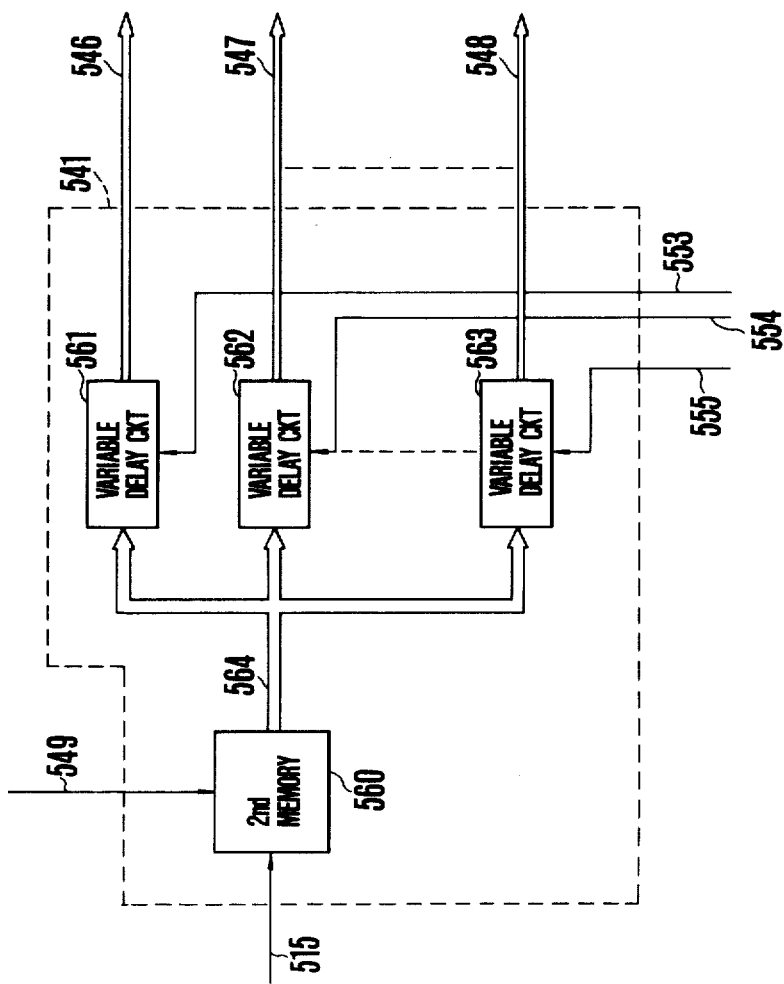

Now, the operation of the memory unit 541 will be described with reference to FIG. 22. The signals of the previous frame which have been fed from the frame memory 514 through the signal line 515 as shown in FIG. 19 are stored in a second memory 560, and fed out of the memory 560 to a signal line 564 each time that the address signals and the read-out signals are received from the control circuit 542 via the signal line 549. Here the number of the signals which are transferred parallelly through the signal line 564 is 24 on the assumption that the vertical size of block is 8 lines and the detection of movement is effected in the vertical (upward and downward) direction on the TV screen within the range of up to eight lines.

The signal on the signal line 564 is sent to variable delay circuits 561 to 563. Here, the number of the variable delay circuits is such that if one step of the detection is parallelly carried out in one arithmetic operation, this number coincides with that of the largest number of shift vectors in the steps of the detection of movement (for example, in the case of the embodiment explained with reference to FIG. 18, this number is 9 because the first step involves 5 shift vectors, the second step 9 shift vectors and the third step 9 shift vectors, respectively.) Optionally, the detection in one step may be divided into a plurality of sub-steps. The case involving such sub-division of a step will be described later.

The variable delay circuits 561 to 563 pick up, from the signals delivered via the signal line 564, the signals of the previous frame which are shifted in accordance with the shift control signals fed via the signal lines 553 to 555 respectively, and send them to the detector 543 via the signal lines 546 to 548.

The variable delay circuits 561 to 563 will be described with reference to FIG. 23. Since the operations of the variable delay circuits 561 to 563 are identical to each other, they will be represented by the operation of the variable delay circuit 561 in the following description. In the description given so far, the signal line 564 assumed to be one line as illustrated. The description which follows is based on the assumption that the data of 12 horizontal scanning lines are parallelly sent into the variable delay circuit 561 (as when the vertical size of block is 4 horizontal scanning lines and the detection of movement is effected within the range of four horizontal scanning lines in the vertical (upward and downward) direction. The signal line 564, therefore, is divided into 12 sub-lines which are indicated as 564₁ to 564₁₂ for the sake of identification in the diagram. Although the number of wires of the respective signal lines 553 to 555 is required, as described hereinbefore, to equal that of bits enough to express the largest possible amount of shift both in the vertical and horizontal directions in the TV scene. However, for the sake of simplicity of description, they have been represented by one line. In the following description, lines for transmittng the shift control signals in the horizontal direction is identified as 553₁ and that for transmitting the shift control signals in the vertical direction as 553₂, respectively.

Figure 23:
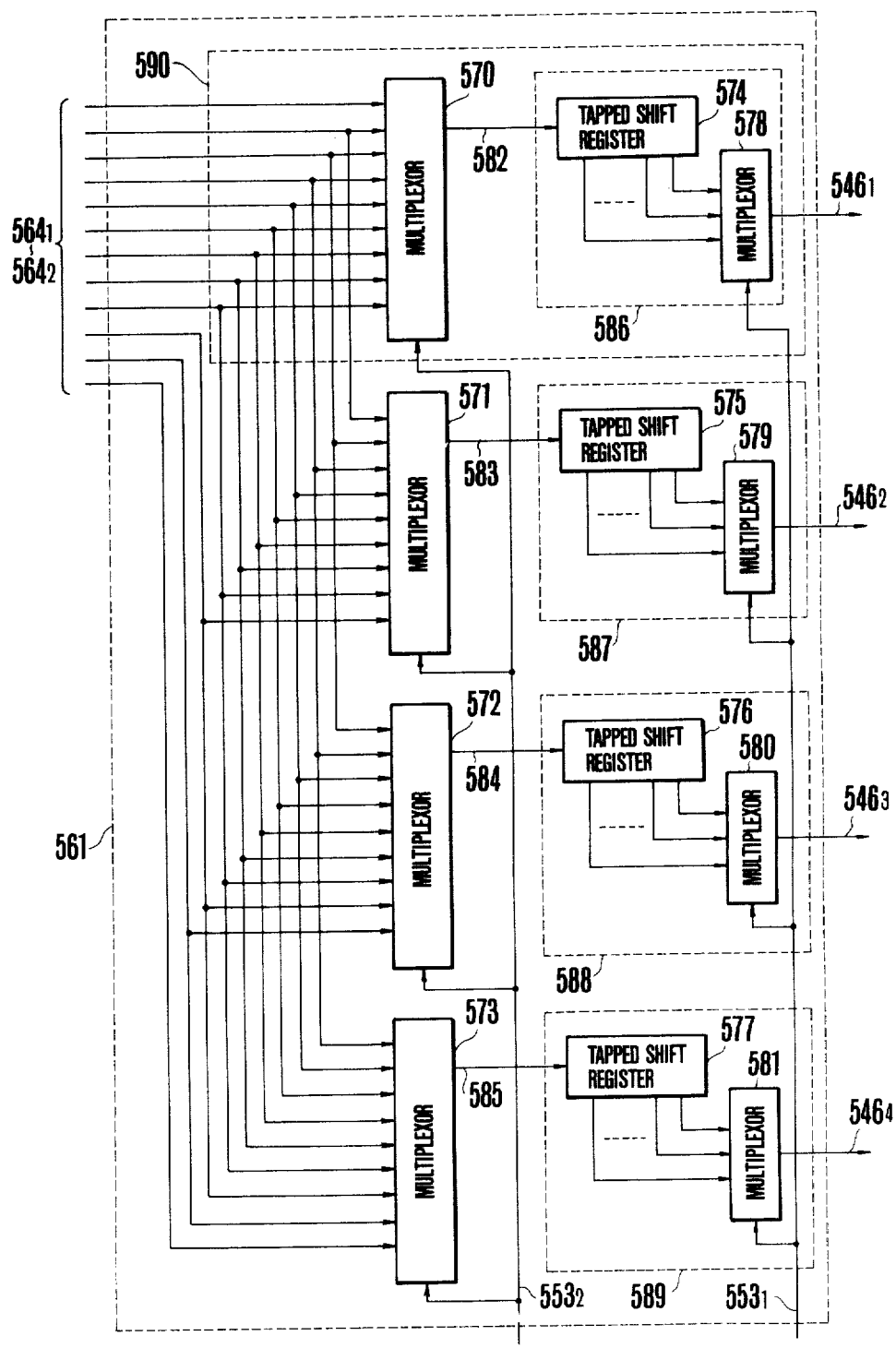

In FIG. 23, it is assumed that the signal lines 564₅ to 564₈ correspond to the block of the present frame (i.e., the signals on the signal lines 564₅ to 564₈ are selected as prediction signals when the movement in the veritcal direction is 0). For the sake of convenience, the subscript N in the numeral 564ₙ is defined to be such that the position occupied by the signal line identified by the numeral on the TV scene rises in proportion as the value of N decreases.

Upon receipt of the control signals which are issued when the signal line 553₂ is shifted upwardly by one line in the vertical direction, a multiplexor 570 transfers the signal on the signal line 564₄ to a signal line 582, a multiplexor 571 transfers the signal on the signal line 564₅ to a signal line 583 and, similarly, multiplexors 572 and 573 transfer the signals on the signal lines 564₆ and 564₇ to signal lines 584 and 585, respectively. Similarly, when the vertical shift control signals of other values are received, the signals on the signal lines which deviate by the amount of control value from the reference positions of the signal lines 564₅ to 564₈ are fed out to the signal lines 582 to 585, respectively.

Basically, the operation of the circuit composed of the multiplexors 570 to 573 described above is completely identical with that of the POSITION SCALER (such as, for example, the b 8-bit position scaler No. 8243 dealt with in pages 267–270 of the "SIGNETICS DATA MANUAL" issued by Signetics Corp. in 1976). Where the number of parallel output lines of the memory 560 of FIG. 22 is small, the aforementioned integrated circuit may be used.

In FIG. 23, the operations of the parts denoted by reference numerals 586, 587, 588 and 589 are completely identical with one another. In the following description, therefore, the operations will be represented by the operation of the part identified by reference numeral 586.

The signal on the signal line 582 is fed to a tapped shift register 574. Here, the number of taps in the shift register is determined by the maximum range of detection of the rate in the horizontal direction. For example, the number of taps is 17 where the detection of the movement is effected with respect to 8 samples in the horizontal direction (rightward and leftward). The signals fed out by the individual taps of the shift register 574 are fed in parallel to a multiplexor 578. From the inputs thus received, the multiplexor 578 singles out one input in accordance with the horizontal shift control signal fed via the signal line 553₁ and transfers it to a signal line 546₁. In this manner, the signals of the previous frame which have been shifted from the block of signals of the present frame in accordacne with the shift control signals on the signal lines 553₁ and 553₂ are obtained.

Now, concerning the arrangement of the variable delay circuit 532 of the decoder of FIG. 20, it is added that since the output of this variable delay circuit 532 has only one horizontal scanning line as its unit, it suffices to form this circuit 532 with a portion of the transmission side variable delay circuit 534 enclosed with dotted line denoted by reference numeral 590 in FIG. 23 (In this case, the signal on the signal line corresponding to the position of the signal line 564₅ is fed out when no movement occurs in the vertical direction).

Figure 24:
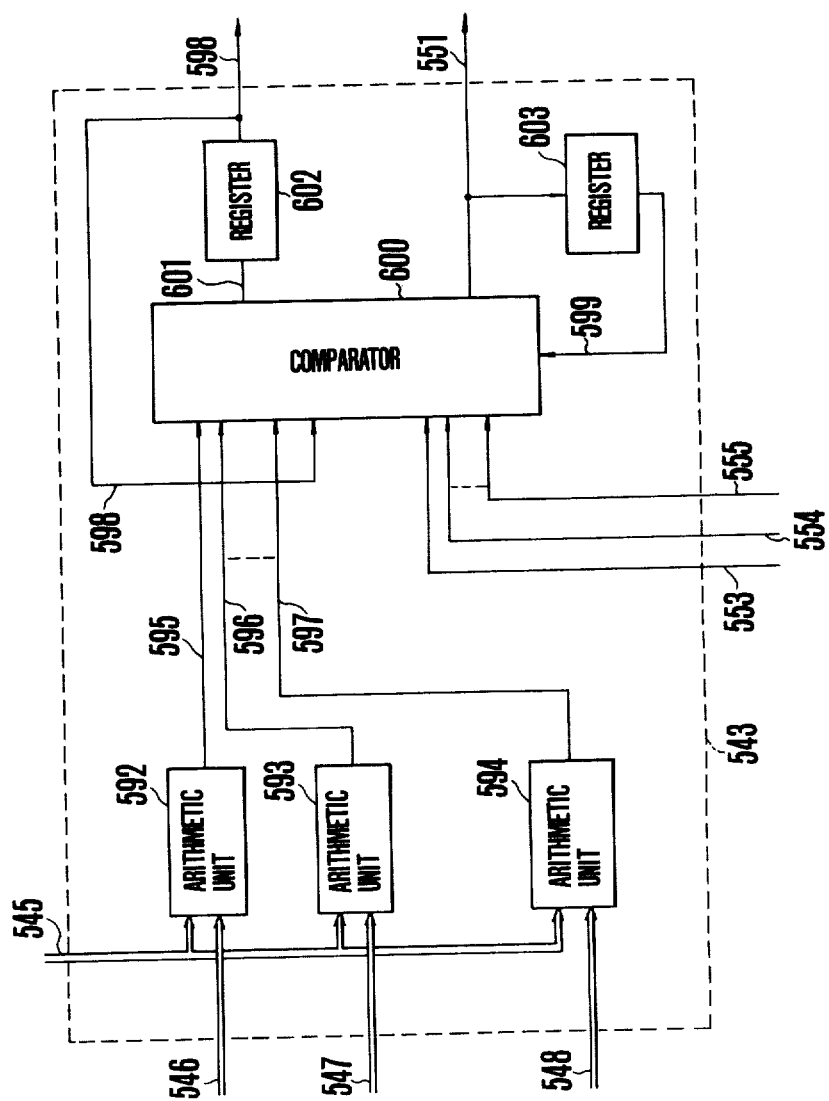

Now, the operation of the detector 543 will be described with reference to FIG. 24. As already touched upon in connection with the operation of the memory unit 541, choice between two types of the detector arrangement is possible depending on whether one step of the detection is parallelly performed by one arithmetic operation or performed in a plurality of sub-steps. First, the description is made of the case where one step of the detection is performed by one parallel arithmetic operation (in which case, registers 602 and 603 can be removed; signal lines 601 and 551 can stand for signal lines 598 and 599, respectively).

The signals on the signal lines 546 to 548 are fed to arithmetic units 592 to 594, respectively. In the meantime, the signals of the block of the present frame are fed via the signal line 545 to th arithmetic units 592 to 594, for the calculation of the aforementioned values of evaluation functions. The results of the calculation are sent via the signal 595 to 597 respectively to a comparator 600. To the comparator 600, the shift control signals (which respectively correspond to the amount of shift involved in the shifted signals of the previous frame fed through the signal lines 546 to 548) have been applied in advance. The comparator 600, therefore, compares the values of evaluation function fed via the signal lines 595 to 597, singles out the shift control signal corresponding to the minimal value of evaluation function and transfers it to the signal line 551. (For example, the comparator 600 sends the shift control signal on the signal line 552 to the signal line 551 when the value of evaluation function fed via the signal line 595 is minimal.)

Now, the operation which is involved where one step of the detection is performed in a plurality of sub-steps will be described. Since the operations of the arithmetic units 592 to 594 are entirely the same as those described above, they are omitted from the following description. In this case, the minimum of all the values of evaluation function fed via the signal lines 595 to 597 on the first occasion of the detection is sent via the signal line 601 to the register 602. Besides, the shift control signal which has been fed via the signal line 551 is sent to the register 603. On the second occasion of the detection, the shift control signals which correspond to the shift vectors used for the subsequent determination of values of evaluation functions are obtained. The corresponding values of evaluation functions are calculated in the arithmetic units 592 to 594 and delivered to the comparator 600. In the comparator 600, the results of the second arithmetic operation fed via the signal lines 595 to 597 (i.e., the results of the arithmetic operation performed on the shift control signals fed on the second occasion of the detection) and the minimal values of the first detection fed via the signal line 598 from the register 602 are compared. The shift vectors representing the minimal values of the first occasion of the detection are also fed via the signal line 599 to the register 603. On the second and following occasions of the detecton, therefore, the comparison is performed on the evaluation functions to be fed via the signal lines 595 to 597 until the final results of that step are obtained. In the first occasion of the detection, there exist no signals to be fed via the signal line 598. The possibility that the signal fed via the signal line 598 on the first occasion of the detection will assume the minimal value will be precluded by forcibly setting the register 602 at the maximum possibly assumed by the evaluation value on the first occasion of the detection.

Now, the operations of the arithmetic units 592 to 594 will be described with reference to FIG. 25. Since the operations of the arithmetic units 592 to 594 are identical with one another, they will be represented by the operation of the arithmetic unit 592 in the following description. Further, in the arithmetic unit 592, since the parallel processing is performed only on the number of lines corresponding to the size of the block in the vertical direction (the number being indicated as 4 in the illustration), the following description will be limited to the route from the signal line $546_1$ to an adder 613 as shown in FIG. 25.

In a subtractor 610, subtraction is performed between the signals of the present frame fed via the signal line $545_1$ and the shifted signals of the previous frame fed via the signal line $546_1$. The resulting difference signal is transferred to a code converter $611_1$. This code converter $611_1$ determines whether or not the absolute value of the difference signal received exceeds a threshold value and adds a value of 1(one) to the contents of an accumulator $612_1$ each time that the absolute value is in excess of the threshold value. This accumulator which may be a counter is required to be cleared before the detection of movement in each step is ready to start. (When the detection of movement in each step is divided into a plurality of sub-steps, this clearing of the accumulator is to be made before the start of the detection in each of the sub-steps.) On completion of the detection in each step, the values in accumulators $612_1$ through $612_4$ are read out and fed to the adder 613, in which the results of arithmetic operations started at the signal lines $546_1$ through $546_4$ and performed throughout the four routes are summed up and fed to the signal line 595.

The above description has been based on the assumption that the evaluation function for the detection of movement is "the number of those of the absolute values of difference signals that exceeds the threshold." Where the evaluation function is defined as "the sum of absolute values of difference signals," a necessary configuration can be obtained by simply substituting the aforementioned code converters $611_1$ through $611_4$ by absolute value circuits, namely, the circuits for delivering out the absolute values of the inputs, and also substituting the accumulators $612_1$ through $612_4$ by adders and registers. Where the evaluation function is otherwise defined as "the sum of squares of difference signals," a necessary configuration can be obtained by substituting the aforementioned code converters $611_1$ through $611_4$ by squaring circuits, namely, the circuits for delivering out the squares of input signals and further substituting the accumulators $612_1$ through $612_4$ by adders and registers.

Figure 26:
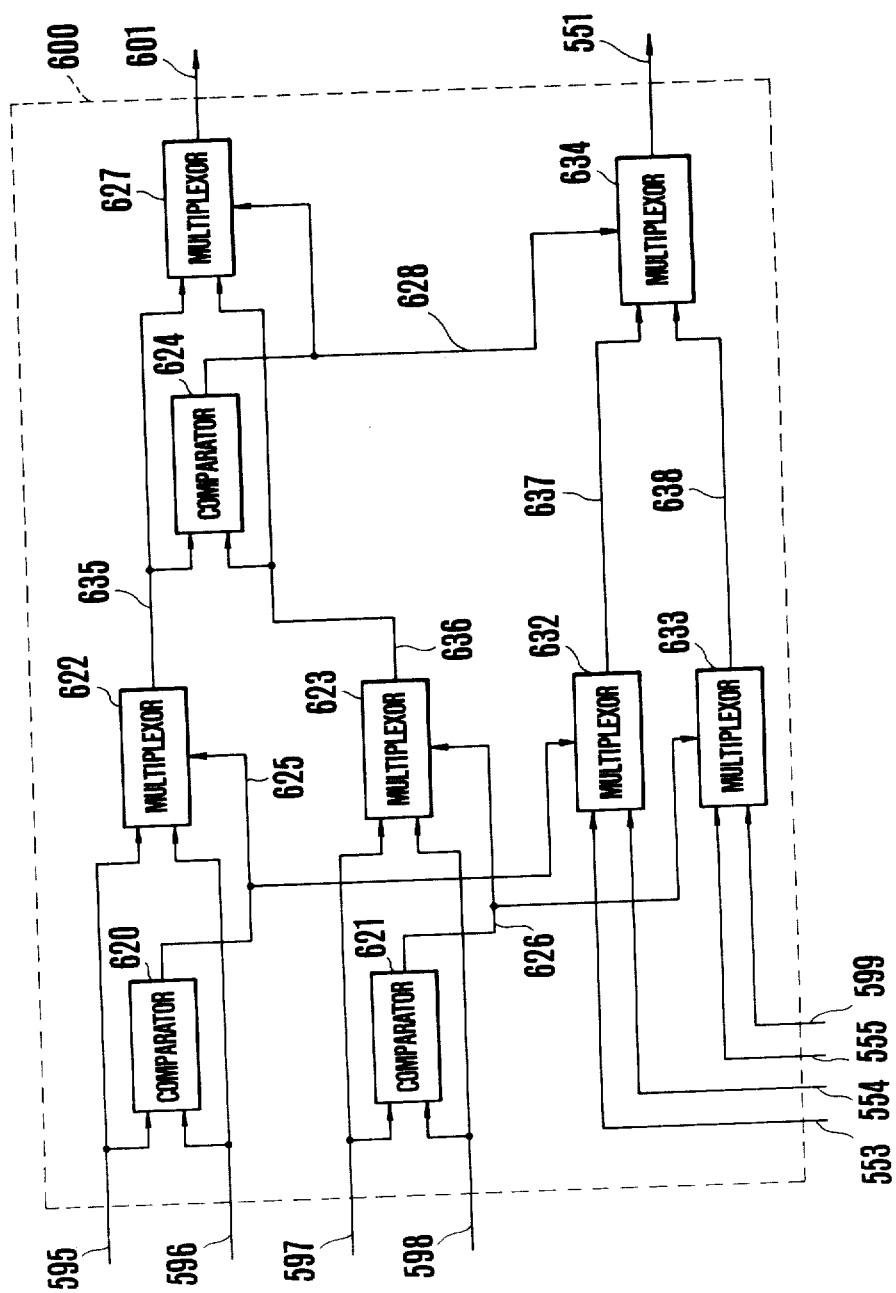

Now, the comparator 600 will be detailed with reference to FIG. 26. FIG. 26 illustrates an embodiment in which the output signals of the four arithmetic units and the corresponding shift control signals are fed in. The same manner can be applied even when the number of input signals is different from that shown here.

First, the results of the arithmetic operation performed in the arithmetic units received from the signal lines 595 and 596 are delivered to a comparator 620 and a multiplexor (hereinafter abbreviated as "MPX") 622. The comparator 620 compares the signal on the signal line 595 with that on the signal line 596. When the signal on the signal line 595 has a smaller value, it causes the MPX 622 to transfer the value of the signal on the signal line 595 via a signal line 625 to a signal line 635. Otherwise, the signal value on the signal line 596 is delivered out. In the meantime, the signal on the signal line 625 has access to an MPX 632. When the value of the signal on the signal line 595 is smaller, the MPX 632 is caused to transfer to the signal line 637 the shift control signal on the signal line 553 corresponding to the value of the signal on the signal line 595. Otherwise, the shift control signal on the signal line 554 corresponding to the value of the signal on the signal line 596 are delivered out.

Also with a comparator 621 and an MPX 623 and an MPX 633, entirely the same operation is performed in relation to the comparison of the value of the signal on the signal line 597 and that on the signal line 598. Of the signals on the signal lines 597 and 598, a smaller value is fed to a signal line 636 and the shift control signal corresponding to such a smaller value is fed to the signal line 638. One of the input signals supplied via the signal lines 555 and 599 to the MPX 633 is selected thereby and delivered onto the signal line 638.

Further, the values which have been fed out to the signal lines 635 and 636 are sent to a comparator 624 and an MPX 627. When the value on the signal line 635 is smaller, an MPX 634 is caused to transfer the shift control signal on the signal line 637 to the signal line 551. Otherwise, the shift control signal on the signal line 638 are fed out. Similarly, the MPX 627 is caused to transfer either of the signal lines 635 or 636 to the signal line 601.

As described above, this embodiment realizes an inter-frame encoder which allows a significant reduction in the volume of arithmetic operations for the detection of movement in the TV picture image by performing this detection of movement in a plurality of separate steps and which permits the motion-correction encoding without entailing any apreciable addition to the scale of equipment involved.

Besides the embodiments described above may be modified as below. In the description given above, it has been assumed that, in the detection of movement in each of the plurality of steps (I steps, where I stands for a positive finite integer), a particular, single shift vector giving the minimal value of evaluation function is singled out of the I-th group of shift vectors and, on the basis of this particular shift vector, the (I+1)-th shift vector group subjected to the determination of movement in the (I+1)-th step is determined. Optionally, the determination of the (I+1)-th shift vector group may be carried out by first detecting from among the I-th group of shift vectors, a specified plurality of shift vectors (such as two shift vectors having the minimal values of evaluation functions) based on the value of evaluation function for the I-th step. In this case, the detector 543 delivers out a plurality of shift control signals (signal line 551).

Further, in the foregoing description, it has been assumed that the movement correction is effected by finding the moving vector of the TV picture image between the input TV signals of the present frame and the TV signals of the previous frame preceding by one frame. A modification aimed at accomplishing the detection of the moving vector between the signals of a previous frame preceding by an amount other than one frame (providing that one field equals 0.5 frame) and the input TV signals can be realized with substantially the same configuration (except that the frame memories in the encoder and decoder have varied capacities).

As has been explained so far, in the movement correction inter-frame coding, the detection of the movement of picture image (moving vector or optimum prediction function) is carried out as follows.

The detection is effected by dividing a given TV scene into small blocks and, for each of the blocks, shifting the signal of the previous frame with respect to a fixed reference on the TV scene (the amount of this shifting is referred to as "shift vector" and the signal of the previous frame thus subjected to the shifting corresponds to the prediction signal mentioned above), finding the difference of the shifted signal from the signal of the block in the present frame, calculating the value of evaluation function from the difference signal, and determining, as the moving vector of the block in question, the particular shift vector which minimizes the value of evaluation function. It should be understood again that the moving vector stands for the optimum prediction function.

For the evaluation, there have been heretofore used the following two evaluation functions.

Figure 27:
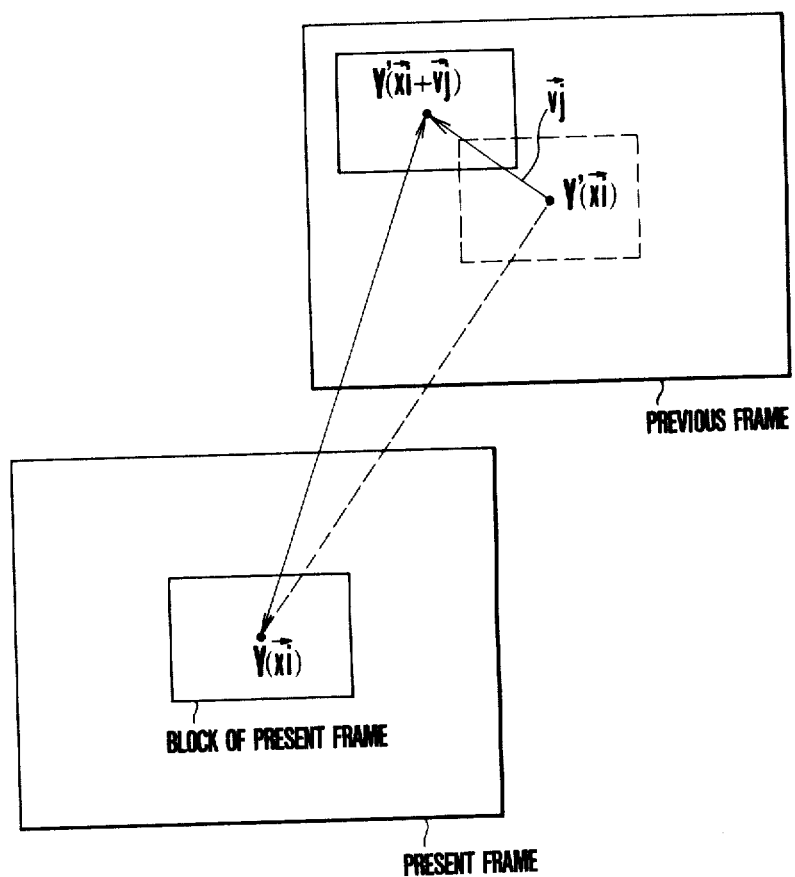
FIG. 27 is a diagram for illustrating the prediction using displacement vector.

With reference to FIG. 27, $\vec{x}_i$ denotes the position vector indicating the position of a picture element on the TV scene, $\vec{v}_j$ the shift vector, $Y(\vec{x}_i)$ the value of luminance of the picture element at $\vec{x}_i$ in the present frame, and $Y'(\vec{x}_i)$ the value of luminance of the picture element at $\vec{x}_i$ in the previous frame. Then, there are available an evaluation function 1, $D_1(\vec{v}_j)$, which is $$D_1(\vec{v}_j) = \sum_i d_{i,j} \tag{1}$$

and an evaluation function 2, $D_2(\vec{v}_j)$, which is $$D_2(\vec{v}_j) = \sum_i TH(d_{i,j}) \tag{2}$$

where $d_{i,j} = |Y(x_i) - Y'(x_i + v_j)|$, $$TH(d_{i,j}) = \begin{cases} 1 \text{ for } d_{i,j} = T \\ 0 \text{ for } d_{i,j} < T, \text{ and} \end{cases}$$

T represents a threshold value.
In formulas (1) and (2) above, $$\sum_i$$

denotes the integration with respect to the picture elements within a relevant block.

As regards the significance of formulas (1) and (2), the formula (1) indicates that the value obtained by integrating the absolute value $d_{i,j}$ of the difference signal with respect to the picture elements within the block is used as the evaluation function value for the shift vector $\vec{v}_j$. The formula (2) indicates that the number of picture elements whose absolute value $d_{i,j}$ exceeds the threshold value (the number may be regarded as representing the ratio of the number of picture elements whose absolute value has exceeded the threshold in consequence of a shifting of $\vec{v}_j$) is used as the evaluation function value for the shift vector $\vec{v}_j$.

Although the use of the formula (1) leads to highly accurate detection of moving vector and notably effective reduction in the volume of generated information, it entails a disadvantage that since the computation of evaluation function values and the comparison of evaluation function values demand high arithmetic accuracy, an inevitable increase in the scale of the system is encountered. In case where the block has a size of 4 lines × 8 picture elements and the accuracy of the absolute difference value, $d_{i,j}$, is within 8 bits, for example, the results of the integration according to the formula (1) require the accuracy of 13 bits. This means that the comparison of 13-bit signals for various shift vectors is required.

The formula (2) has been obtained by simplifying the formula (1) with a view to solving this problem. Compared with the formula (1), this formula (2) has a disadvantage that the accuracy of the detection of moving vectors is low where the TV' scene involves objects in particularly large motions or where the size of the divided blocks is small.

In this embodiment, an evaluation function which is easier to determine than by the formula (1) and which has a higher accuracy in the detection of moving vector than formula (2) is contemplated. Thus, in the detection of moving vector in a given TV scene, the luminance level of the picture elements of the previous frame existing at the position deviating by the amount of shift vector from the position of the picture elements of the present frame is compared with that of the picture elements of the present frame, the degree of the differences thus found (in the form of $d_{i,j}$, for example) is quantized by the manner to be described below, the quantized values found for the individual picture elements within the relevant block are integrated, and the results of the integration are used as the evaluation values, thereby detecting the moving vector and effecting the movement corrected interframe coding. In the quantization, degree of differences is classified into at least three groups as by assigning small degrees of differences to one small-degree group, large degrees of differences to one large-degree group, and so on, one definite numerical value is allotted to the individual groups, and as the output, the numerical values assigned to the groups of various degrees are produced.

Accordingly, this embodiment is advantageous in that the apparatus required is smaller in scale than that employed where the outcome of the formula (1) is used as the evaluation function and the accuracy of the detection of moving vector is as high as obtained by formula (1). Essentially, the accuracy of detection by formula (2) is inferior to that by formula (1). The evaluation function to be used for the detection of moving vector is required to satisfy such a relation that the volume of information to be transmitted decreases in proportion as the evaluation function value decreases. In this respect, the formula (1) is accepted as the most rational evaluation function. In contrast, the formula (2) pays regard solely to the question whether or not the absolute value of difference, $d_{i,j}$, exceeds the threshold value and disregards the magnitude of the absolute value $d_{i,j}$ virtually. This is why the accuracy of detection by the formula (2) is inferior to that by the formula (1). It follows that use of the evaluation function which pays due consideration to the magnitude of $d_{i,j}$ (as is realized by the formula (1)) permits an improvement in the accuracy of the detection of moving vector over that obtainable by the formula (2).

In this embodiment, as described above, the absolute value, $d_{i,j}$, of difference expressed by $N_o$ bits is classified or converted into a signal, $e_{i,j}$ expressed with Nk bits ($1 < Nk < N_o$), the converted signal is integrated with respect to the individual picture elements within the block, and the resultant sum is used as the evaluation function value.

Figure 28:
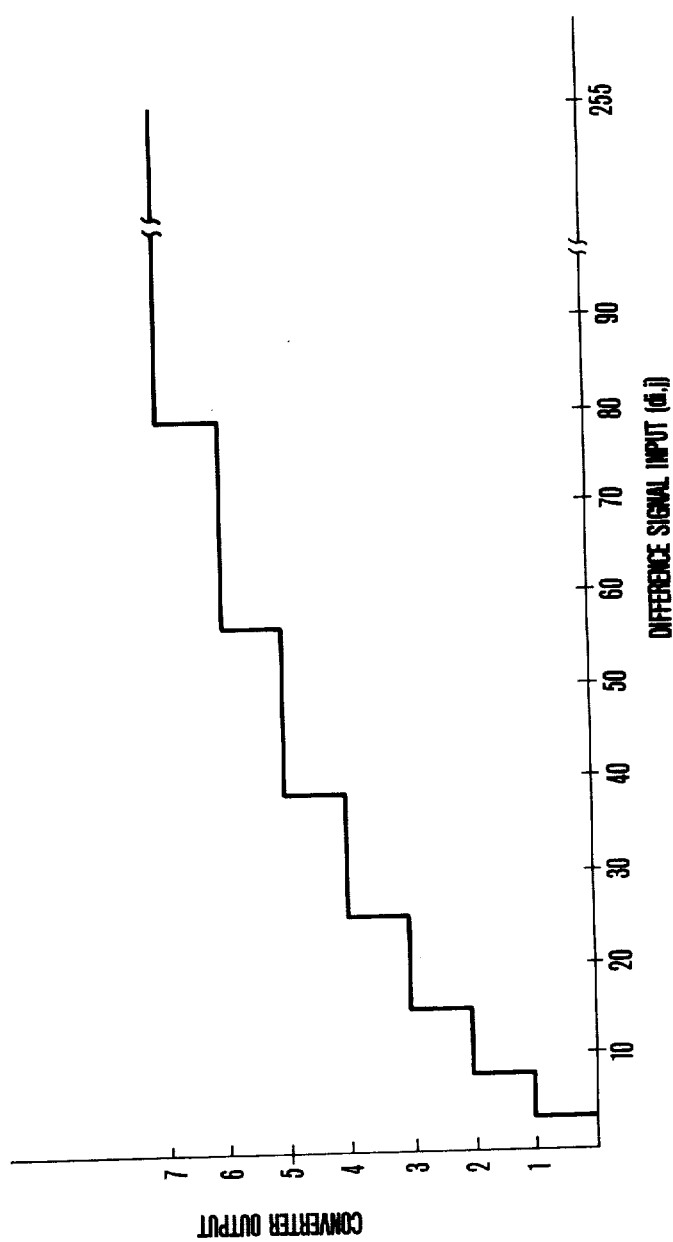
FIG. 28 is a diagram illustrating characteristics of a converter required for the displacement vector detection.

This conversion is illustrated in FIG. 28, where abscissa represents the difference signal input $d_{i,j}$ and ordinate the converter output. FIG. 28 illustrates one typical example of the conversion of the $d_{i,j}$ signal of 8 bits into the $e_{i,j}$ signal which is expressed with 3 bits.

Now, the reason for fixing the lower limit of the number of groups to 3 will be described.

When the number of groups is decreased to 2, the manner contemplated by this embodiment comes to equal that of the formula (2), which is inferior to the manner by the formula (1) and, accordingly, to the manner of this embodiment in terms of the accuracy of moving vector detection. Hence the lower limit of 3 is selected. The conversion is carried out in the manner described above because large $d_{i,j}$ values occur where the calculation of evaluation function values is performed with respect to shift vectors widely differing from moving vectors of a TV image picture and, therefore such large $d_{i,j}$ values have substantially no effect upon the accuracy of the detection of moving vectors and also because many small $d_{i,j}$ values occur with respect to shift vectors approximating moving vectors and, therefore, no accurate detection of moving vectors is accomplished unless such small $d_{i,j}$ values are faithfully reflected in the evaluation function values. When the conversion is performed as described above, the accuracy of the detection of moving vectors can be maintained on the same level as what is obtained by the formula (1) and the detection of moving vectors can be attained by use of the apparatus smaller in scale than that required where the formula (1) is resorted to. Specifically, since the number of lines for transmission of input signals to the accumulator required for the integration is reduced, the capacity of the accumulator is proportionately decreased in conjunction with the number of arithmetic bits required in the comparator for the comparison of evaluation function values.

The foregoing description is based on an assumption that the degrees of differences mentioned above are evaluated by the $d_{i,j}$ values. This assumption holds true even when this evaluation is based on some other scales such as, for example, a value of $(d_{i,j})^2$. Accordingly, where the simplification of system is the sole purpose, a manner which eliminates bits of least significance from the $d_{i,j}$ values, accumulates only the remaining bits of greatest significance in the $d_{i,j}$ values and uses the resultant sums as the evaluation function values may readily be thought of. This method, however, only serves to degrade the accuracy of arithmetic operations and hardly reflects the $d_{i,j}$ values faithfully in the evaluation function values. The accuracy of the detection of moving vectors by this method is inferior to that obtainable by the manner of this embodiment.

It should be understood that from comparison of the embodiment based on the principle as explained with reference to FIG. 18 with the embodiment based on the principle as explained with reference to FIGS. 27 and 28, the latter can be materialized by substantially the same hardware as that for the former. While the embodiment based on FIG. 18 deals with the moving vector found by the multi-step detection of movement, the embodiment based on FIGS. 27 and 28 directly treats the moving vector. For example, in the embodiment readable on FIG. 18, the prediction signal generator 511 carries out the multi-step detection of movement and sends the signal representative of a moving vector found by the multi-step detection of movement to the second encoder 518 via the signal line 519 whereas, in the embodiment readable on FIGS. 27 and 28, the prediction signal directly detects a moving vector and sends the signal indicative of the detected moving vector to the second encoder. Thus, in the former embodiment, the code converters $611_1$ to $611_4$ shown in FIG. 25 each operate as a comparator which performs the comparison with the threshold, and the accumulators $612_1$ to $612_4$ may operate as counters being applied with one-bit input. In contrast, in the latter embodiment, the code converter serves to convert the absolute value of difference signal di,j into the ei,j of less bit number and the accumulator is applied with a plural bit input. In other words, the "less bit number" is equal to 1(one) for the former embodiment but is unequal to 1(one) for the latter embodiment. In consideration of conditions set forth above, the hardware as shown in FIGS. 19 through 26 may be used for the embodiment based on the principle explained with reference to FIGS. 27 and 28.

What is claimed is:

1. A coded video signal transmitting and receiving system comprising in combination a coding apparatus using a plurality of prediction functions and provided for a transmitter, a decoding apparatus provided for a receiver, and coded signal transmission path means, whereby a coded video signal transmitted from the coding apparatus via the transmission path means is received at the decoding apparatus and decoded thereby, said coding apparatus comprising:
  scan converter means which forms from, a video signal received in time series two-dimensional blocks each consisting of a plurality of picture elements which extend over a plurality of scanning lines, and outputs the video signal in a different sequence from that of said input time series;
  error signal generating means which generates a predictive error value per block with respect to arbitrary one of said plurality of prediction functions associated with each block;
  prediction function designation means which designates a prediction function to generate a subsequent prediction error value by use of part or all of prediction error values which have been generated by said error signal generating means;
  prediction signal generating means which determines an optimum prediction function selected from prediction functions produced from said prediction function designation means after a predetermined time as elapsed, and generates prediction signals for picture elements in said two-dimensional block sequentially in accordance with said optimum prediction function;
  predictive coding means which performs predictive coding by use of said prediction signal and the video signal output from said scan converter means; and code compressor means which performs compression coding for at least a signal representing said optimum prediction function and the prediction error signal delivered from said predictive coding means, to produce a compressed predictive coding signal, said decoding apparatus comprising:

means which receives the compressed predictive coding signal sent from the coding apparatus via said transmission path means, for separating said compressed code by expansion into a signal representing said optimum prediction function and a corresponding prediction error signal;

means which receives a supplementary decoded video signal, for generating a prediction signal in accordance with a signal representing a prediction function separated by said separating means;

predictive decoding means which receives an output of said prediction signal generating means and a prediction error signal separated by said separating means, for generating said decoded video signal;

scan inverter means which transforms an output of said prediction decoding means into the video signal in said original time series.

2. A high efficiency video signal predictive coding apparatus using a plurality of prediction functions comprising:

scan converter means which forms from, a video signal received in time series two-dimensional blocks each consisting of a plurality of picture elements which extend over a plurality of scanning lines, and outputs the video signal in a different sequence from that of said input time series;

error signal generating means which generates a predictive error value per block with respect to arbitrary one of said plurality of prediction functions associated with each block;

prediction function designation means which designates a prediction function to generate a subsequent prediction error value by use of part or all of prediction error values which have been generated by said error signal generating means;

prediction signal generating means which determines an optimum prediction function selected from prediction functions produced from said prediction function designation means after a predetermined time as elapsed, and generates prediction signals for picture elements in said two-dimensional block sequentially in accordance with said optimum prediction function;

predictive coding means which performs predictive coding by use of said prediction signal and the video signal output from said scan converter means; and code compressor means which performs compression coding for at least a signal representing said optimum prediction function and the prediction error signal delivered from said predictive coding means.

3. A predictive decoding apparatus comprising:

means which receives a predictive coding signal for a video signal produced from a block-formation video signal which is rearranged in a different sequence than an original time series and compressed for coding inclusive of at least a signal representing an optimum prediction function and a corresponding prediction error signal, for separating said compressed code by expansion into a signal representing said optimum prediction function and a corresponding prediction error signal;

means which receives a supplementary decoded video signal, for generating a prediction signal in accordance with a signal representing a prediction function separated by said separating means;

predictive decoding means which receives an output of said predictive signal generating means and a prediction error signal separated by said separating means, for generating said decoded video signal;

scan inverter means which transforms an output of said prediction decoding means into the video signal in said original time series.

4. A high efficiency predictive coding apparatus in accordance with claim 2 wherein said error signal generating means comprises:

a memory for storing video signals necessary for generating prediction signals used for at least the current block and the succeeding block, said prediction signals being expressed by said plurality of prediction functions;

signal generating means which receives information specifying one of said plurality of prediction function to read out a video signal stored in an address of said memory corresponding to said information, for generating a prediction signal;

supplementing means which provides within a duration of the current block a supplementary video signal necessary for generating a prediction signal which is expressed by said plurality of prediction functions and used for said succeeding block;

prediction error value generating means which combines said memory, said signal generating means and said supplementing means, for generating an error value between the video signal from said scan converter means and the prediction signal from said signal generating means; and error signal generating means which computes prediction error values in parallel for part or all of picture elements in said two-dimensional block with respect to arbitrary one of said plurality of prediction functions by use of a plurality of said prediction error value generating means.

5. A high efficiency predictive coding apparatus in accordance with claim 2, wherein said prediction function designation means comprises:

error signal generating means which generates for said block a prediction error value per block with respect to specified one of said plurality of prediction functions within a unit time period;

comparison means which compares a prediction error value generated by said error signal generating means in the present unit time period with a prediction error value which has been judged smallest in the past, so as to determine a smaller prediction error value; and prediction function designation means which indicates a prediction function used in the subsequent unit time period to said error signal generating means in accordance with the result of comparison by said comparison means.

6. A high efficiency predictive coding apparatus for video signals comprising:

means for forming blocks each consisting of a plurality of picture elements for an input signal supplied to the predictive coding apparatus so that a high coding efficiency is obtained for moving pictures;

means for selecting a plurality of blocks used for detecting an optimum prediction function which minimizes error values for said blocks in accordance with signals supplied from a picture element storage circuit which stores video signals for one frame;

means for computing error values of a plurality of blocks from said selecting means relative to a block associated with said input signal;

deduction means for comparing a plurality of error values corresponding to said plurality of blocks so as to deduce a direction in which the error value decreases sharpest;

control means for controlling the repetition and termination of processes including selection of a plurality of blocks which are different from said plurality of blocks, computation of said error values and deduction of the sharpest decreasing direction of said error values in accordance with the result of deduction by said deduction means;

means for determining said optimum prediction function which gives the minimum error value at the completion of said selection, computation and deduction; and means for performing predictive coding by use of the determined optimum prediction function and said input signal.

7. A high efficiency predictive coding apparatus in accordance with claim 2, wherein said prediction function designation means comprises:

means for computing an evaluation function value from an input video signal and a video signal associated with the previous frame at positions deviating by a given vector (shift vector) from a reference point on a field which coincides with a block of the input video signal;

means for detecting the optimum prediction function in Io separate steps (Io$\geq$2) while determining in the I-th step (I=1, 2, . . . , Io−1) the (I+1)-th group of shift vectors on the basis of an evaluation function calculated with respect to the I-th group of shift vectors and, in the Io-th step, detecting one shift vector as a displacement vector (an optimum prediction function) indicative of the displacement of the picture on the basis of the evaluation function value calculated with respect to the Io-th group of shift vectors; and means for encoding said displacement vector.

8. A high efficiency predictive coding apparatus in accordance with claim 7, wherein said evaluation function value is the number of difference signals between the input video signals and the video signals associated with the previous frame at the positions deviating by a given shift vector from those of said input video signal, said difference signals exceeding a fixed threshold value.

9. A high efficiency predictive coding apparatus in accordance with claim 2 or 6 which comprises:

means which for selection of predictive signals, compares luminance levels of picture elements associated with input video signals and divides the degree of differences resulting from the comparison into at least three groups as by assigning small degrees of differences to one small-degree group, large degrees of differences to one large-degree group, and so on, for weighting each of the groups by one quantized value;

means which accumulates the degrees of differences in terms of the quantized values with respect to the picture elements within the block, for determining the evaluation values; and means for selecting from the evaluation values obtained with respect to said plurality of predictive signals those predictive signals capable of reducing the values thereof.

* * * * *